US010033931B2

(12) United States Patent
Takeda

(10) Patent No.: US 10,033,931 B2
(45) Date of Patent: Jul. 24, 2018

(54) IMAGE PROCESSING APPARATUS AND IMAGE PROCESSING METHOD FOR PROCESSING STILL IMAGE DATA

(71) Applicant: CANON KABUSHIKI KAISHA, Tokyo (JP)

(72) Inventor: Eishi Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/874,564

(22) Filed: Oct. 5, 2015

(65) Prior Publication Data

US 2016/0119576 A1    Apr. 28, 2016

(30) Foreign Application Priority Data

Oct. 22, 2014    (JP) .................................. 2014-215521

(51) Int. Cl.
*H04N 5/232* (2006.01)
*H04N 9/82* (2006.01)
*H04N 9/804* (2006.01)
*H04N 5/77* (2006.01)
*H04N 1/21* (2006.01)
*H04N 5/91* (2006.01)

(52) U.S. Cl.
CPC ......... *H04N 5/23293* (2013.01); *H04N 1/212* (2013.01); *H04N 1/2125* (2013.01); *H04N 5/772* (2013.01); *H04N 9/8042* (2013.01); *H04N 9/8227* (2013.01); *H04N 5/91* (2013.01)

(58) Field of Classification Search
CPC ............. H04N 5/23293; H04N 9/8227; H04N 9/8042; H04N 5/772; H04N 1/212; H04N 1/2125; H04N 5/23245; H04N 5/91
See application file for complete search history.

(56) References Cited

U.S. PATENT DOCUMENTS

2002/0041757 A1*  4/2002  Takahashi .......... H04N 5/23293
                                                          386/230
2008/0136942 A1*  6/2008  Yoon .................. H04N 5/23293
                                                          348/231.99
2008/0205869 A1*  8/2008  Nose ...................... G03B 17/20
                                                          396/77

(Continued)

FOREIGN PATENT DOCUMENTS

JP        2005-286612 A     10/2005

*Primary Examiner* — Nelson D. Hernández Hernández
(74) *Attorney, Agent, or Firm* — Fitzpatrick, Cella, Harper & Scinto

(57) ABSTRACT

An imaging processing apparatus includes a frame position determining unit configured to specify during a reproduction of developed first moving image data a frame position in the first moving image data of an image designated during the reproduction of the first moving image data by a user as an image to be extracted as a still image, a developing unit configured to read out undeveloped image data at a frame position adapted to the frame position specified by the frame position determining unit from undeveloped second moving image data corresponding to the first moving image data and develop the undeveloped image data, a still image encoding unit configured to compression encode the image data developed by the developing unit into a still image data, and a recording unit configured to record the still image data obtained by being compression encoded by the still image encoding unit onto a recording medium.

8 Claims, 20 Drawing Sheets

(56) References Cited

U.S. PATENT DOCUMENTS

2012/0033103 A1* 2/2012 Corey ................ H04N 5/23245
                                              348/231.6
2014/0111670 A1* 4/2014 Lord .................. H04N 5/23206
                                              348/240.99

* cited by examiner

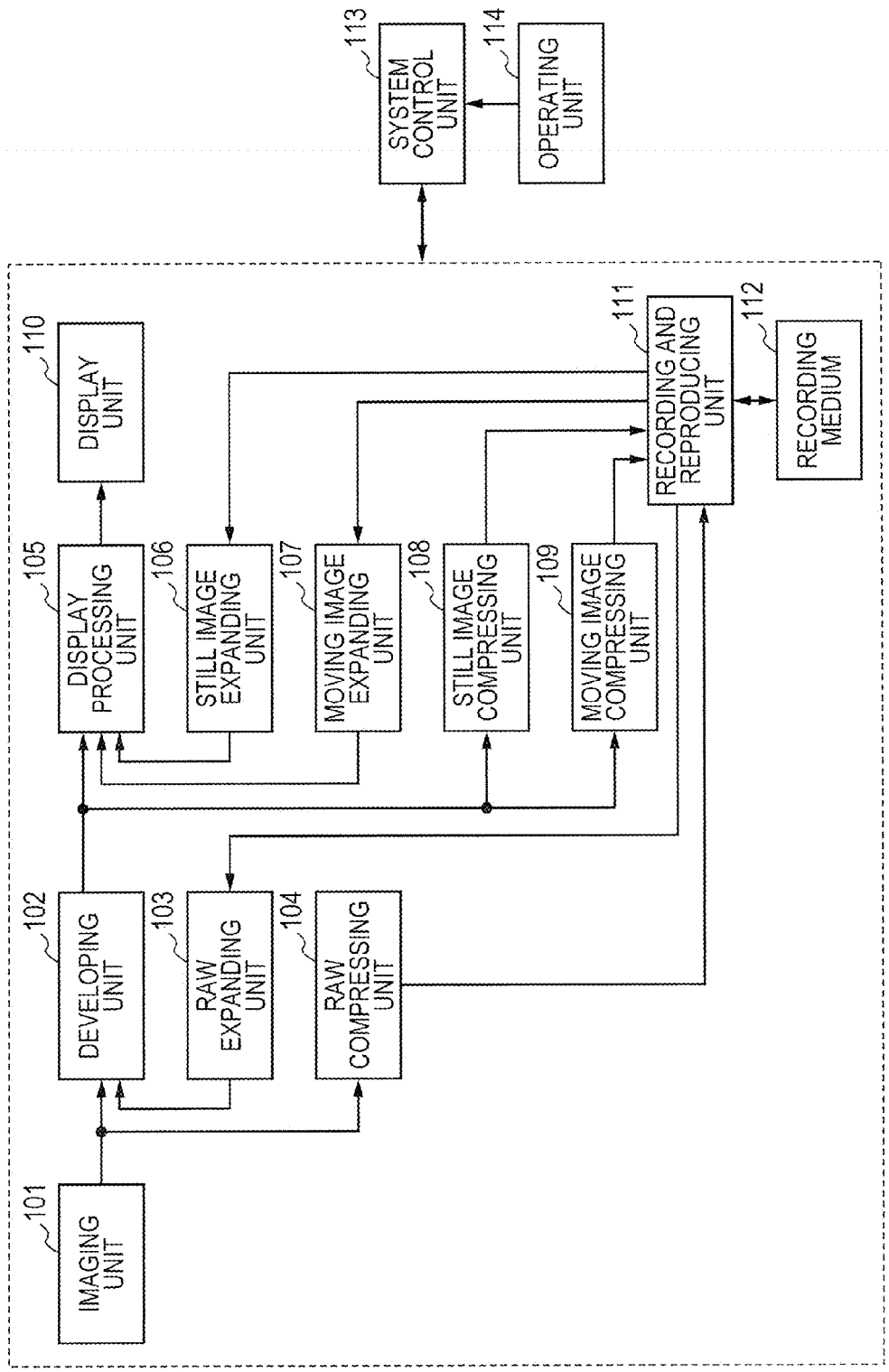

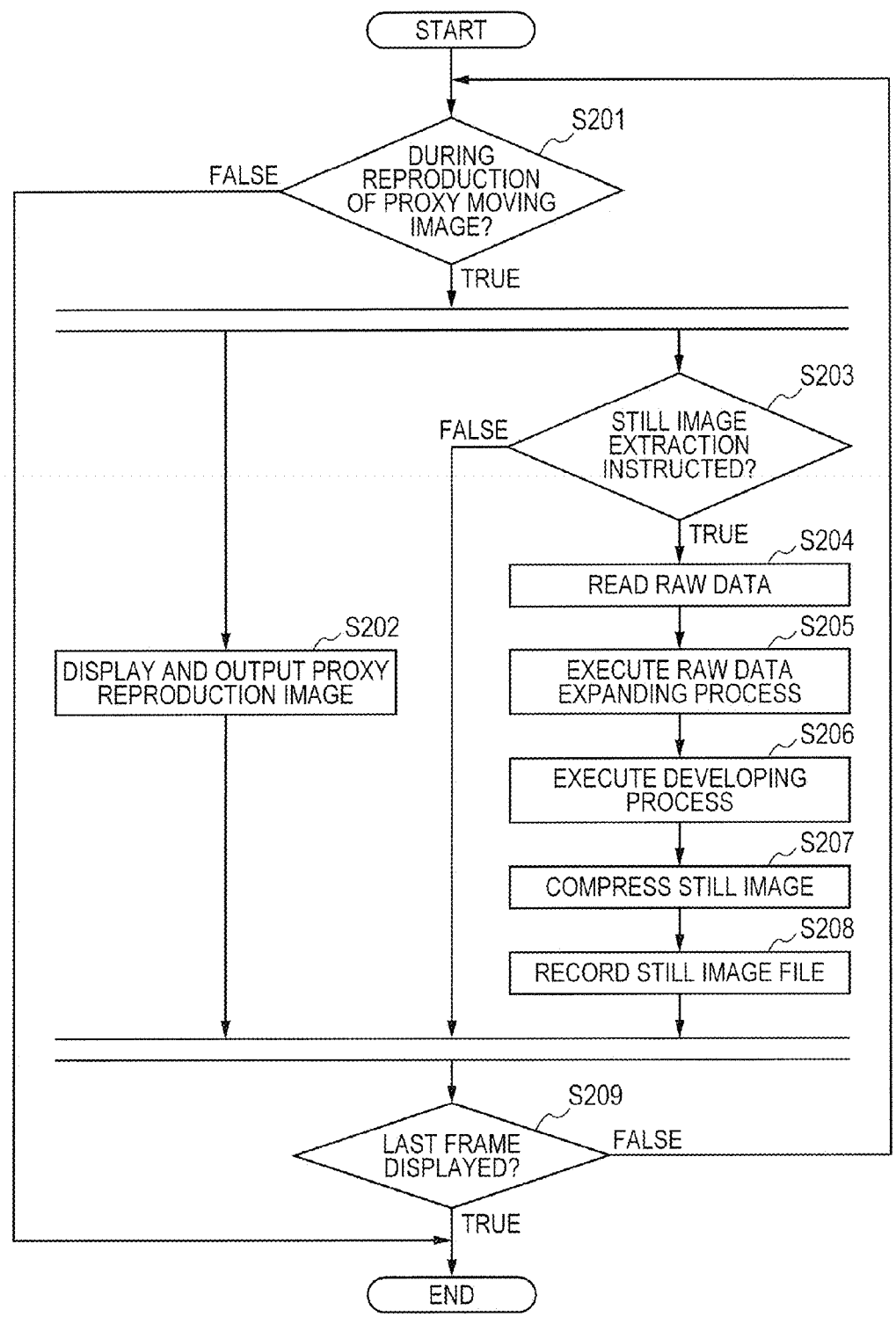

FIG. 3A

ACCESS MANAGEMENT INFORMATION

| FILE NAME |
|---|
| RECORDING DATE/TIME |
| TOTAL NUMBER OF FRAMES |
| OFFSET ADDRESS OF THE 1ST FRAME |
| DATA SIZE OF THE 1ST FRAME |
| OFFSET ADDRESS OF THE 2ND FRAME |
| DATA SIZE OF THE 2ND FRAME |
| OFFSET ADDRESS OF THE 3RD FRAME |
| DATA SIZE OF THE 3RD FRAME |
| ...... |
| OFFSET ADDRESS OF THE NTH FRAME |
| DATA SIZE OF THE NTH FRAME |

FIG. 3B

ACCESS MANAGEMENT INFORMATION OF PROXY MOVING IMAGE

| MOVIEnnn.246 |
|---|
| 20xx/mm/yy hh:mm:ss |
| 600 FRAMES |
| 0x0000_0000 — THE 1ST FRAME |
| 0x0000_3000 |
| 0x0000_3000 — THE 2ND FRAME |
| 0x0000_1800 |
| 0x0000_4800 — THE 3RD FRAME |
| 0x0000_1000 |
| ...... |
| 0x0021_3400 — THE 600TH FRAME |
| 0x0000_2000 |

FIG. 3C

ACCESS MANAGEMENT INFORMATION OF RAW MOVING IMAGE

| MOVIEnnn.raw |
|---|
| 20xx/mm/yy hh:mm:ss |
| 600 FRAMES |
| 0x0000_0000 — THE 1ST FRAME |
| 0x0001_5000 |
| 0x0001_5000 — THE 2ND FRAME |
| 0x0002_0000 |
| 0x0003_5000 — THE 3RD FRAME |
| 0x0001_FF00 |
| ...... |
| 0x0876_5400 — THE 600TH FRAME |
| 0x0004_3000 |

FIG. 6

CAPTURE POSITION INFORMATION

| |
|---|
| CAPTURE TARGET RAW FILE NAME |
| THE NUMBER OF CAPTURE DESIGNATED FRAMES |
| OFFSET ADDRESS TO THE 1ST CAPTURE DESIGNATED FRAME IMAGE |
| DATA SIZE OF THE 1ST CAPTURE DESIGNATED FRAME |
| OFFSET ADDRESS TO THE 2ND CAPTURE DESIGNATED FRAME IMAGE |
| DATA SIZE OF THE 2ND CAPTURE DESIGNATED FRAME |
| ⋮ |
| OFFSET ADDRESS TO THE NTH CAPTURE DESIGNATED FRAME IMAGE |
| DATA SIZE OF THE NTH CAPTURE DESIGNATED FRAME |

SELECTING SCREEN OF THE CAPTURE IMAGE A

SELECTING SCREEN OF THE CAPTURE IMAGE B

SELECTING SCREEN OF THE CAPTURE IMAGE C

SELECTING/DECIDING SCREEN OF THE CAPTURE

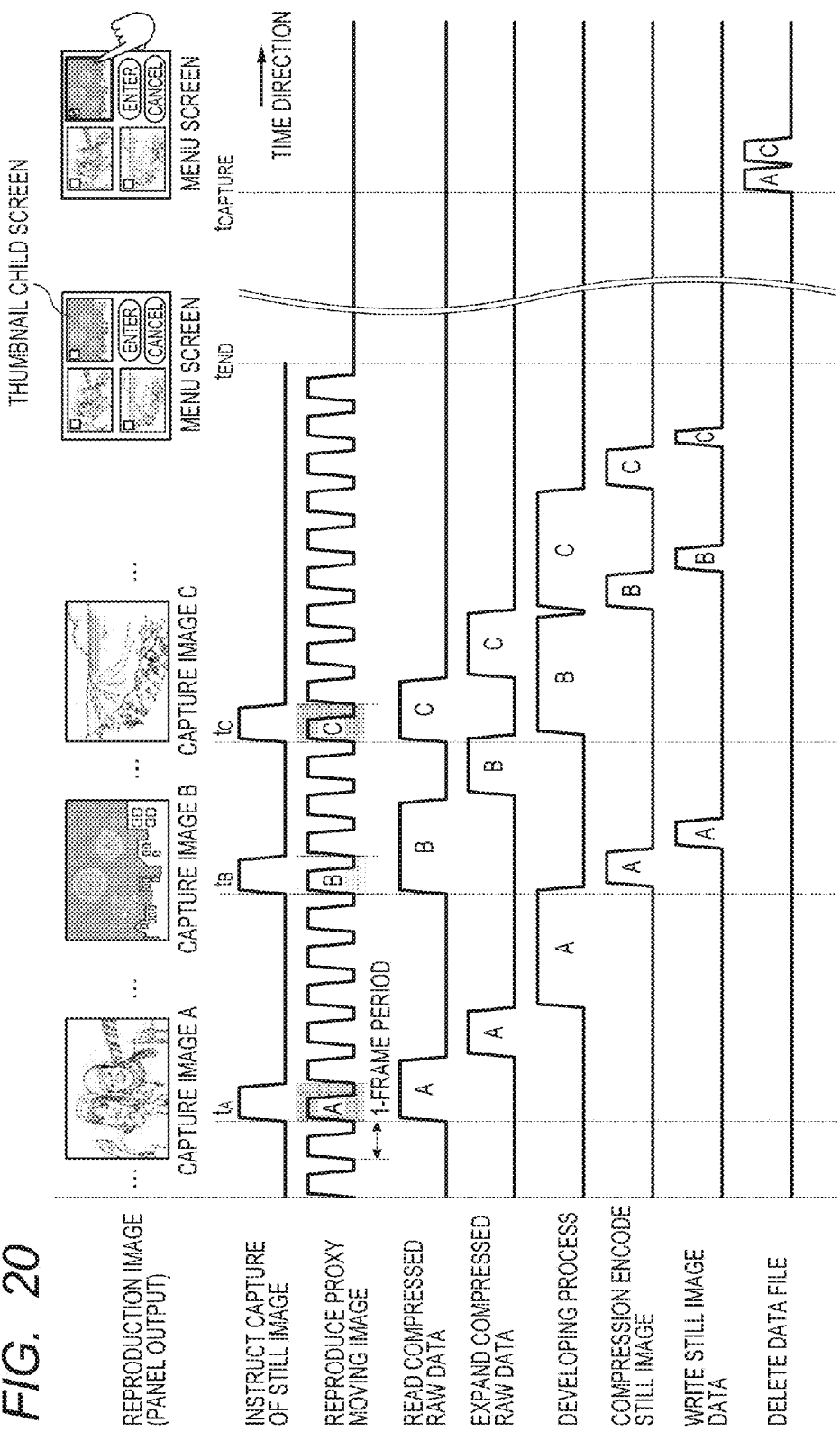

IMAGE PROCESSING APPARATUS AND IMAGE PROCESSING METHOD FOR PROCESSING STILL IMAGE DATA

BACKGROUND OF THE INVENTION

Field of the Invention

The present invention relates to an image processing apparatus and an image processing method and, more particularly, to an image processing apparatus and an image processing method in which a RAW image of a moving image is handled.

Description of the Related Art

In an imaging device in the related arts, raw image information (RAW image) photographed by an imaging sensor is deBayer processed (demosaic processed) and converted into a luminance signal and color difference signals and, thereafter, what is called a developing process such as noise elimination, optical distortion correction, image optimization, and the like is executed with respect to each signal. Generally, the development processed luminance signal and color difference signals are compression encoded and recorded into a recording medium.

On the other hand, an imaging device which can record a RAW image also exists. As for the RAW image, although an amount of data necessary to record is extremely large, since there is such an advantage that an original image can be edited after the photographing while suppressing deterioration to the original image to a minimum limit, the RAW image is intentionally used by a high-ranking person.

In recent years, in association with a high processing speed of an image processing circuit and a large storing capacity of a recording medium, an imaging device which simultaneously records both of compression encoded image data and RAW image data has also been proposed. In such an imaging device which can simultaneously record the data, the compression encoded image data of a small data amount is handled as proxy data, the RAW image data serving as a main image is not directly accessed, and functions such as designation of start and end positions of a scene on the proxy data, output to a sub-screen, and the like are realized. In this manner, the compression encoded image data is used in an application for realizing simplicity and a high processing speed of an editing work after the photographing.

On the other hand, such a still image capture function that during the reproduction of compression encoded moving image data after the recording, only an arbitrary image frame designated by the user is extracted and stored and recorded separately from the moving image data as a printable still image data format such as JPEG or the like has been proposed. However, since a screen size of a still image suitable for a print application is larger than a screen size of a moving image and a picture quality is also deteriorated due to the compression encoding, a still image of a high quality cannot be always obtained.

Japanese Patent Application Laid-Open No. 2005-286612 discloses such a unit that interpolation pixels are generated by using a frame image in print designated moving image data and reference frame images of the frame image and a synthesis image of a larger screen size is obtained.

However, according to the method whereby after the compression encoded moving image data was decoded, a plurality of reference frame images are held and synthesized as disclosed in Japanese Patent Application Laid-Open No. 2005-286612, in the case of an image in which there are many motions of an object to be photographed or an image in which a scene change occurs, a correlation between the reference frame images and the decoded image is low. Therefore, a still image of a high picture quality cannot be always obtained.

According to the construction of the imaging device which can simultaneously record the RAW image data and the compression encoded moving image data, by developing the RAW image data without a deterioration in picture quality after that, the still image of a high quality can be obtained. However, according to such a method, in order to designate the extracting position of the still image, since it is necessary to temporarily stop the reproduction of the proxy moving image each time and execute the developing process of the RAW image, there is such a risk that a complexity of the user operation is caused and a working load increases.

SUMMARY OF THE INVENTION

It is an aspect of the invention to provide an image processing apparatus and an image processing method in which still image data of a high precision at a desired frame position selected by the user can be developed and generated from a RAW image without temporarily stopping the operation during a reproduction of a moving image.

According to an aspect of the invention, there is provided an image processing apparatus including a frame position determining unit configured to specify during a reproduction of a developed first moving image data a frame position in the first moving image data of an image designated during the reproduction of the first moving image data by a user as an image to be extracted as a still image, a developing unit configured to read out an undeveloped image data at a frame position adapted to the frame position specified by the frame position determining unit from an undeveloped second moving image data corresponding to the first moving image data and develop the undeveloped image data, a still image encoding unit configured to compression encode the image data developed by the developing unit into a still image data, and a recording unit configured to record the still image data obtained by being compression encoded by the still image encoding unit into a recording medium.

According to an aspect of the invention, there is provided an image processing method including specifying during a reproduction of a developed first moving image data a frame position in the first moving image data of an image designated during the reproduction of the first moving image by a user as an image to be extracted as a still image, reading out an undeveloped image data at a frame position adapted to the specified frame position from an undeveloped second moving image data corresponding to the first moving image data and developing the undeveloped image data, compression encoding the developed image data into a still image data, and recording the still image data obtained by being compression encoded into a recording medium.

Further features of the present invention will become apparent from the following description of exemplary embodiments with reference to the attached drawings.

BRIEF DESCRIPTION OF THE DRAWINGS

FIG. 1 is a block diagram illustrating a schematic construction of an image recording and reproducing apparatus according to a first embodiment of the present invention.

FIG. 2 is a flowchart illustrating an image processing method according to the first embodiment of the present invention.

FIGS. 3A, 3B and 3C are diagrams illustrating data structures of access management information in the image processing method according to the first embodiment of the present invention.

FIG. 6 is a diagram illustrating a data structure of capture position information in an image processing method according to the second embodiment of present the invention.

FIG. 20 is a diagram illustrating operation timing and a transition of an output screen in the image processing method according to the seventh embodiment of the present invention.

DESCRIPTION OF THE EMBODIMENTS

Preferred embodiments of the present invention will now be described in detail in accordance with the accompanying drawings.

First Embodiment

An image recording and reproducing apparatus and an image processing method according to a first embodiment of the present invention will be described with reference to FIGS. 1 to 4.

Figure 4:
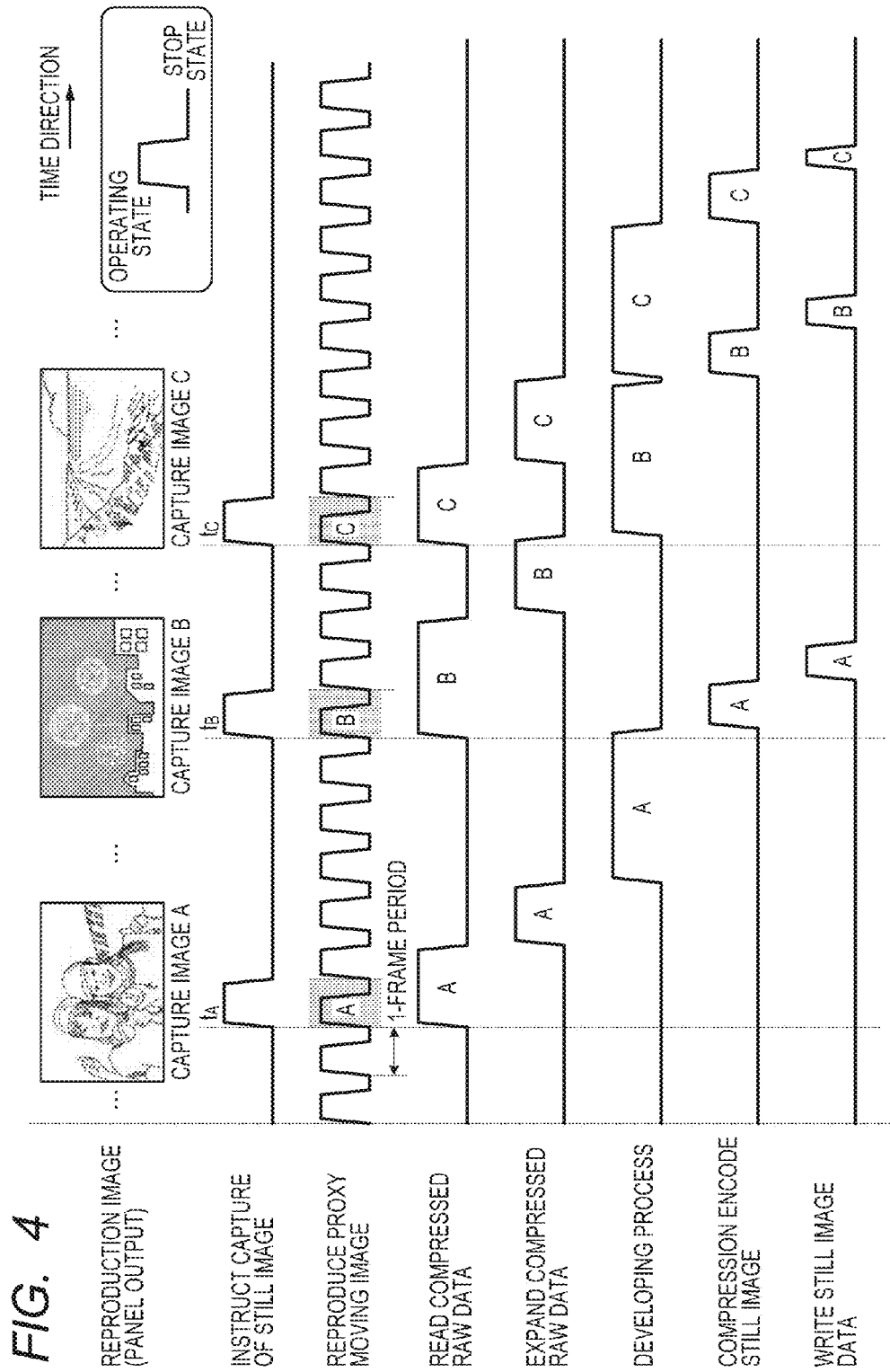
FIG. 4 is a diagram illustrating operation timing and a transition of an output screen in the image processing method according to the first embodiment of the present invention.

FIG. 1 is a block diagram of the image recording and reproducing apparatus according to the present embodiment. FIG. 2 is a flowchart illustrating the image processing method according to the present embodiment. FIGS. 3A to 3C are diagrams illustrating data structures of access management information in the image processing method according to the present embodiment. FIG. 4 is a diagram illustrating operation timing and a transition of an output screen in the image processing method according to the present embodiment.

<System Construction>

A system construction of the image recording and reproducing apparatus according to the present embodiment will be described with reference to FIG. 1.

As illustrated in FIG. 1, an image recording and reproducing apparatus 100 according to the present embodiment includes an imaging unit 101, a developing unit 102, a RAW expanding unit 103, and a RAW compressing unit 104. The image recording and reproducing apparatus 100 also includes a display processing unit 105, a still image expanding unit 106, a moving image expanding unit 107, a still image compressing unit 108, a moving image compressing unit 109, a display unit 110, a recording and reproducing unit 111, a recording medium 112, a system control unit 113, and an operating unit (user interface unit) 114.

The imaging unit 101 is a camera unit including a lens (optical member), an imaging sensor, and the like. The imaging unit 101 is a functional block for operating in such a manner that after a photo signal fetched from the lens is converted into an electric signal by the sensor, image information is transmitted to the developing unit 102 and the RAW compressing unit 104 at the post stage. In this specification, the image information which is output from the imaging unit 101 is called "RAW image" which denotes raw (undeveloped) image. As for the RAW image, a specific process (preprocess) such as a correction of a pixel value or the like may have been performed to the RAW image itself.

The developing unit 102 is a functional block for operating in such a manner that the raw image is deBayer processed (demosaic processed) and converted into a luminance signal and color difference signals and, thereafter, what is called a developing process such as elimination of noises included in each signal, optical distortion correction, image optimization, and the like is executed.

The image data which is developed by the developing unit 102 is subjected to a predetermined displaying process, which will be described hereinlater, by the display processing unit 105 and, thereafter, is displayed by the display unit 110. The image data which is developed by the developing unit 102 is also supplied to the still image compressing unit 108 and the moving image compressing unit 109. The still image compressing unit 108 is a functional block for compressing the image data as a still image. The moving image compressing unit 109 is a functional block for compressing the image data as a moving image.

The RAW expanding unit 103 is a functional block for operating in such a manner that a recording file of the RAW data which is compression encoded by the RAW compressing unit 104 is read out of the recording medium 112 through the recording and reproducing unit 111 and is decoded and expanded. The RAW expanding unit 103 supplies the decoded and expanded RAW image to the developing unit 102 so that the user can adjust various kinds of parameters and execute the developing process later.

The RAW compressing unit 104 is a functional block for operating in such a manner that the RAW image which is output from the imaging unit 101 is encoded at a high efficiency by using a compressing technique such as wavelet transformation, differential encoding, or the like and is converted into a compression encoded data file format. The compression encoded image data is recorded as a recording file into the recording medium 112 through the recording and reproducing unit 111.

The display processing unit 105 is a functional block for operating in such a manner that an image process such as resolution conversion, color tone conversion, or the like, a process for OSD multiplexing information such as time code, image pickup parameters (iris, shutter speed, and face detecting area frame), and the like are executed to the obtained image data. The image data as a processing target includes image data which is obtained from the imaging unit 101 or the RAW expanding unit 103 and is developed in the developing unit 102, and the decoded image data which is read out of the recording and reproducing unit 111 or is decoded in the still image expanding unit 106 or the moving image expanding unit 107.

The still image expanding unit 106 is a functional block for operating in such a manner that the still image data which is read out of the recording medium 112 through the recording and reproducing unit 111 and is compression encoded by using the well-known still image encoding system such as a JPEG system or the like is decoded, thereby obtaining the decoded image data. The decoded image data is output from the still image expanding unit 106 to the display processing unit 105.

The moving image expanding unit 107 is a functional block for operating in such a manner that the moving image data which was read out of the recording medium 112 through the recording and reproducing unit 111 and is compressed by using the well-known moving image compression encoding system such as MPEG-2, H.264, H.265, or the like is decoded, thereby obtaining the decoded image data. The decoded image data is output from the moving image expanding unit 107 to the display processing unit 105.

The still image compressing unit 108 is a functional block for information compressing the image data developed by the developing unit 102 by using the foregoing well-known still image compression encoding technique. The information compressed still image data is output from the still image compressing unit 108 to the recording and reproducing unit 111. The still image data which is output to the recording and reproducing unit 111 is recorded as still image file data to the recording medium 112.

The moving image compressing unit 109 is a functional block for information compressing the image data developed by the developing unit 102 by using the foregoing well-known moving image compression encoding technique. The information compressed moving image data is output from the moving image compressing unit 109 to the recording and reproducing unit 111. The moving image data which is output to the recording and reproducing unit 111 is recorded as moving image file data to the recording medium 112.

The display unit 110 is a functional block having a function for outputting the recording image or reproduction image which is image processed by the display processing unit 105 to a display device such as EVF, liquid crystal panel, or the like and a function for outputting the recording image or reproduction image to the outside by using an interface such as HDMI (registered trademark) or the like.

The recording and reproducing unit 111 is a functional block for controlling the recording and reproduction of various kinds of image data to/from the recording medium 112. It is assumed that the recording and reproducing unit 111 has a file system such as an FAT or the like which can access the recorded image data at random on a file unit basis.

As a recording medium 112, a recording medium of a large storing capacity such as SSD, SD card, CF card, HDD, or the like is presumed. It is now assumed that the recording medium 112 has such a transfer rate that the compressed RAW data, the still image data, and the moving image data can be recorded and reproduced in a real time manner.

The system control unit 113 is a functional block for operating in such a manner that, to each of the foregoing functional blocks, the whole operation such as start and stop of the operation, parameter setting, and the like is controlled by a processor such as a CPU (not illustrated) or the like or a micro controller. The system control unit 113 may include a computer-readable recording medium in which a control program in which a processing procedure for causing a computer to execute each processing step of an image processing method, which will be described hereinafter, through the foregoing functional blocks has been described, data of such a control program, and the like have been stored. As a computer-readable recording medium, besides a hard disk, it may be constructed by an optical disk, a magnetooptic disk, a magnetic disk, an IC memory, or the like having an arbitrary shape. Although the control program, its data, and the like are stored in a ROM, the control program and its data may be read out and downloaded from another computer-readable recording medium or in a wireless or wired manner, or through the Internet or the like.

The operating unit 114 is a functional block for operating in such a manner that an operating mode, selection decision information, and the like of the system which are designated by the user are notified to the system control unit 113 through a device for the user interface such as touch panel, button, dial, or the like.

In this manner, an outline of the system construction in the image processing apparatus according to the present embodiment has been described above.

In this specification, there is also a case where the functional block which is mainly constructed by the imaging unit 101 and is used to obtain the image data is called an imaging device and the other functional block for processing the image data obtained from the imaging device is called an image processing apparatus.

<Processing Flow>

An image processing method according to the present embodiment will be described with reference to FIGS. 2 and 3A to 3C.

The image processing method according to the present embodiment includes a processing flow illustrated in FIG. 2. Processes according to this processing flow are executed by such a series of reproducing operation that the moving image data obtained by compression encoding the developed image data by the moving image compressing unit 109 and recording is read out as a proxy image from the recording medium 112 and is displayed to the display unit 110. It is assumed that this processing flow is executed at timing on a frame unit basis. It is also assumed that the RAW moving image data and the proxy moving image data recorded simultaneously with the RAW moving image data have previously been recorded in the recording medium 112.

First, in step S201, whether or not the present system operating state is a state during the reproduction of the proxy moving image data is discriminated.

If the present operating state is not the state during the reproduction of the proxy moving image data, that is, if it is a state during the recording of the RAW moving image data, a state during the recording of the still image, or the like (that is, FALSE in step S201), the present processing flow is finished.

In the case of the state during the reproduction of the proxy moving image (that is, TRUE in step S201), as a normal operation, the moving image data is decoded and the decoded image is obtained by the moving image expanding unit 107. Such an operation that the image processing is executed in the display processing unit 105 and, thereafter, the resultant image data is output to the display unit 110 is executed on a frame unit basis in a real time manner (step S202).

Further, in the image processing method according to the present embodiment, processes of steps S203 to S208 are executed on a background in parallel with the process of step S202. That is, the parallel processes of the processing step of step S202 and the processing steps of steps S203 to S208 are executed.

In step S203, with respect to the image data which is being displayed and output at present, whether or not an instruction to extract the still image from the moving image (hereinbelow, referred to as a capture instruction of the still image) has been issued from the user through the operating unit 114 such as a touch panel or the like is discriminated.

If the capture instruction is not issued (FALSE in step S203), the processing routine advances to step S209.

If the capture instruction has been issued (TRUE in step S203), the image data corresponding to the same frame time position as that of the proxy moving image which is being displayed at present is read out of the undeveloped RAW moving image data (step S204).

As a specific example of realizing the process of step S204, a method of specifying the frame position by using access management information illustrated in FIGS. 3A to 3C will be described. However, as a method of executing step S204, it is sufficient that the apparatus has a unit for associating the frame positions at the same time of the proxy image and the undeveloped RAW image and the present invention is not limited to the method, which will be described here.

The access management information which is used in the process of step S204 is formed at the time of simultaneously recording the compression encoded moving image data and the undeveloped RAW moving image data and is stored and held in the recording medium 112, a nonvolatile memory such as a flash memory (not shown), or the like. As access management information, for example, the access management information of the data structure illustrated in FIG. 3A can be applied. The access management information illustrated in FIG. 3A includes a file name, recording date/time, the total number of frames of the recorded image, and offset addresses and data sizes of the number as many as the number of frames. That is, the offset addresses and the data sizes are shown in a list format, and each offset address is an address from a file head of the frame unit.

When the access management information is formed, two kinds of access management information, that is, access management information for the proxy moving image data illustrated as an example in FIG. 3B and access management information for the RAW moving image data illustrated as an example in FIG. 3C are formed. By forming them as mentioned above, a fact that the image data is the two kinds of moving image data which were simultaneously recorded can be discriminated from the file name so long as a file name with a predetermined naming rule or from the same recording date/time. The recording position and data size of each image data existing at the same frame position can be obtained from the data of the list structure corresponding to the number of frames of the access management information.

For example, it is now assumed that the capture instruction has been issued during the display of the second frame of the proxy moving image file (file name: MOVIEnnn.264). In this case, a process for reading the information of the second frame of the RAW moving image file (file name: MOVIEnnn.raw) by an amount of a data size 0x20000 from an offset address 0x15000 with reference to the access management information.

In this manner, the RAW image data at the same frame position as the frame position where the capture instruction has been issued can be read by applying the access management information. The RAW image data which is read here is the compression encoded RAW image data.

In step S205, the read RAW image data is decoded and expanded again into Bayer data (RAW image data) by the RAW expanding unit 103.

In step S206, a developing process of the RAW image data corresponding to the decoded frame image of the capture instruction is executed by the developing unit 102.

In step S207, the developed data is transferred to the still image compressing unit 108 and the information of the still image data is compressed by applying the well-known still image encoding system.

In step S208, the still image encoded image data is written as a recording file into the recording medium 112 through the recording and reproducing unit 111.

The processing steps of steps S203 to S208 as mentioned above are executed in parallel as background processes of the operation for performing the display output on a frame unit basis in step S202.

Subsequently, in step S209, if it is determined that when the display output of the proxy image reaches an end of the file or a reproduction stop instruction is received by the user operation and the frame image is the last frame image (TRUE in step S209), the processing flow is finished. If the proxy image data which is decoded, displayed, and output in the next frame period still remains (FALSE in step S209), the processing routine advances to step S201 and the foregoing processing steps are repeated.

As mentioned above, the processing flow in the image processing method according to the present embodiment is executed.

<Example of Application>

An example of the operation in the case where the still image capture is performed during the reproduction of the moving image without stopping the reproducing operation by applying the processing flow according to the present embodiment will be described with reference to FIG. 4.

FIG. 4 illustrates operating states of the following items to the time direction: that is, an output screen of the reproduction image (panel output); an instruction of the capture of the still image; a reproduction of the proxy moving image; a reading of the compressed RAW data; an expansion of the compressed RAW data; a developing process; a compression encoding of the still image; and a writing of the still image data. It is assumed that a waveform showing the operating state of each functional block is set to HIGH during the operation and LOW when the operation is stopped. As for the reproduction of the proxy moving image, it is also assumed that a time which is required to process one display screen is set to 1-frame period and the decoding and displaying processes of one display screen are executed in this period of time.

FIG. 4 illustrates a case where the still image capture is executed at timing when the still image capture has been instructed (period of time during which a capture instruction signal in the diagram is set to HIGH) three times in total at time $t_A$, $t_B$, and $t_C$ during the reproduction of the moving image.

For example, the capture instruction can be notified as a command from the operating unit 114 to the system control unit 113 in response to such an operation that the user touched the display screen through the touch panel or the like so as to indicate the reproduction image which is being displayed and output. The unit for recognizing the capture instruction from the user and notifying as a command is not limited to such a unit but any unit may be used so long as it realizes the same function as that mentioned above.

It is assumed that the capture instruction of a capture image A is received at time $t_A$. In the reproduction of the proxy moving image, time $t_A$ corresponds to a frame period shown by a meshed area sandwiched between dotted lines. Therefore, the RAW moving image data adapted to the frame position of the compression encoded data which is being displayed is read out in such a frame period by using the foregoing access management information (reading of the compressed RAW data). The still image capture is executed by executing a series of processes of the foregoing expansion of the compressed RAW data, the developing process, the compression encoding of the still image, and the recording (writing of the still image data).

At this time, it is not always necessary that a processing time of each processing step is completed within the 1-frame period in dependence on a restriction in each of a processing data amount, an occupation ratio of a data bus (not shown), processing performance of the functional block, and the like. Each processing step is executed as a background process in parallel with the reproduction of the proxy moving image.

This is true of the process which is executed when the capture instruction of a capture image B is received at time $t_B$ and the process which is executed when the capture instruction of a capture image C is received at time $t_C$. As mentioned above, even if the capture instruction is issued during the reproduction of the proxy moving image, the still image capture can be performed without stopping the reproduction of the proxy moving image.

As mentioned above, according to the present embodiment, the still image data of a high precision at a desired frame position selected by the user can be developed and generated from the RAW image without temporarily stopping the operation during the reproduction of the moving image.

Second Embodiment

An image recording and reproducing apparatus and an image processing method according to a second embodiment of the present invention will be described with reference to FIGS. 5 to 8. Component elements similar to those in the image recording and reproducing apparatus and the image processing method according to the first embodiment illustrated in FIGS. 1 to 4 are designated by the same reference numerals and characters and their detailed description is omitted or simplified.

Figure 5:
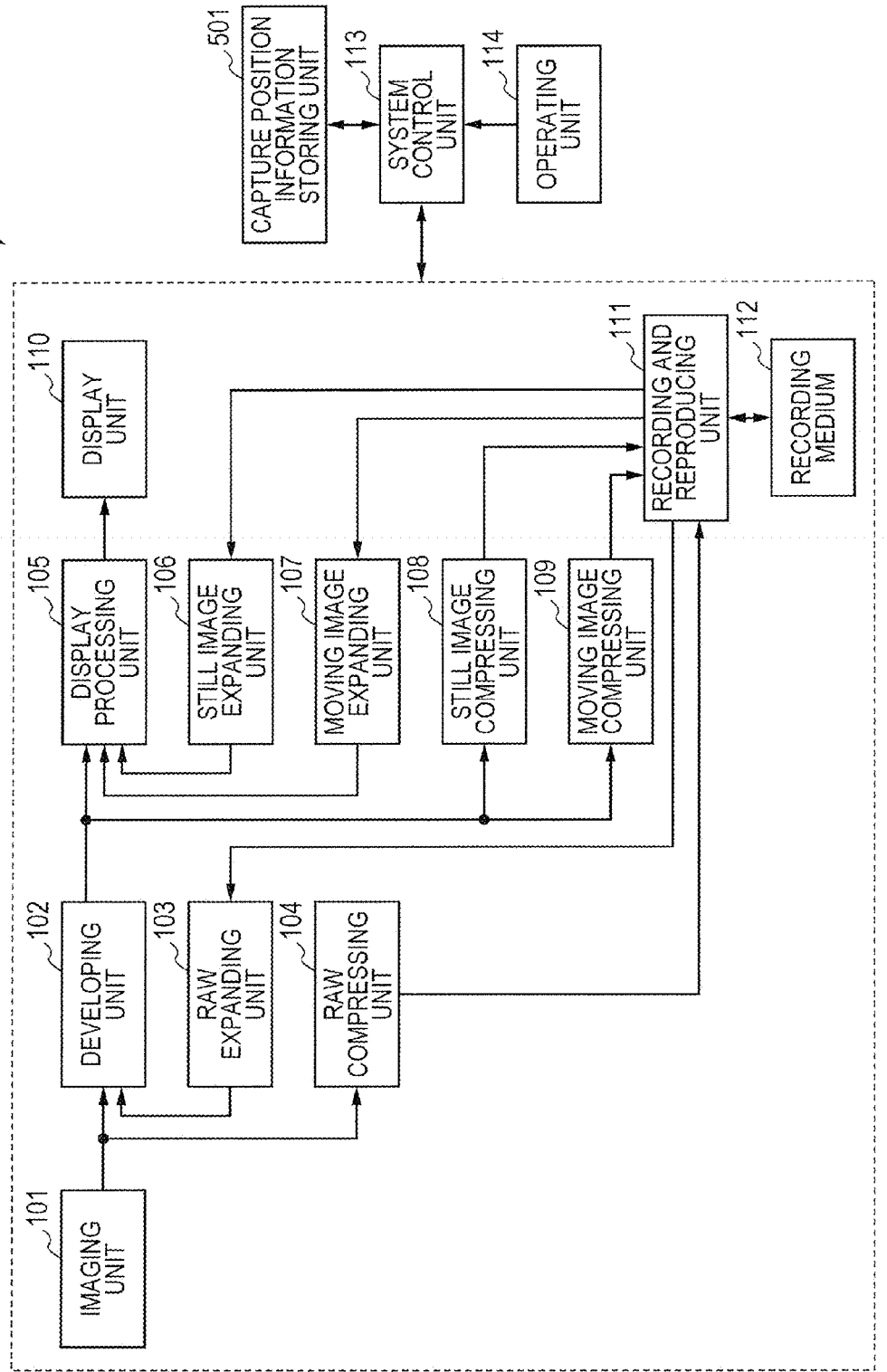
FIG. 5 is a block diagram illustrating a schematic construction of an image recording and reproducing apparatus according to a second embodiment of the present invention.
Figure 7:
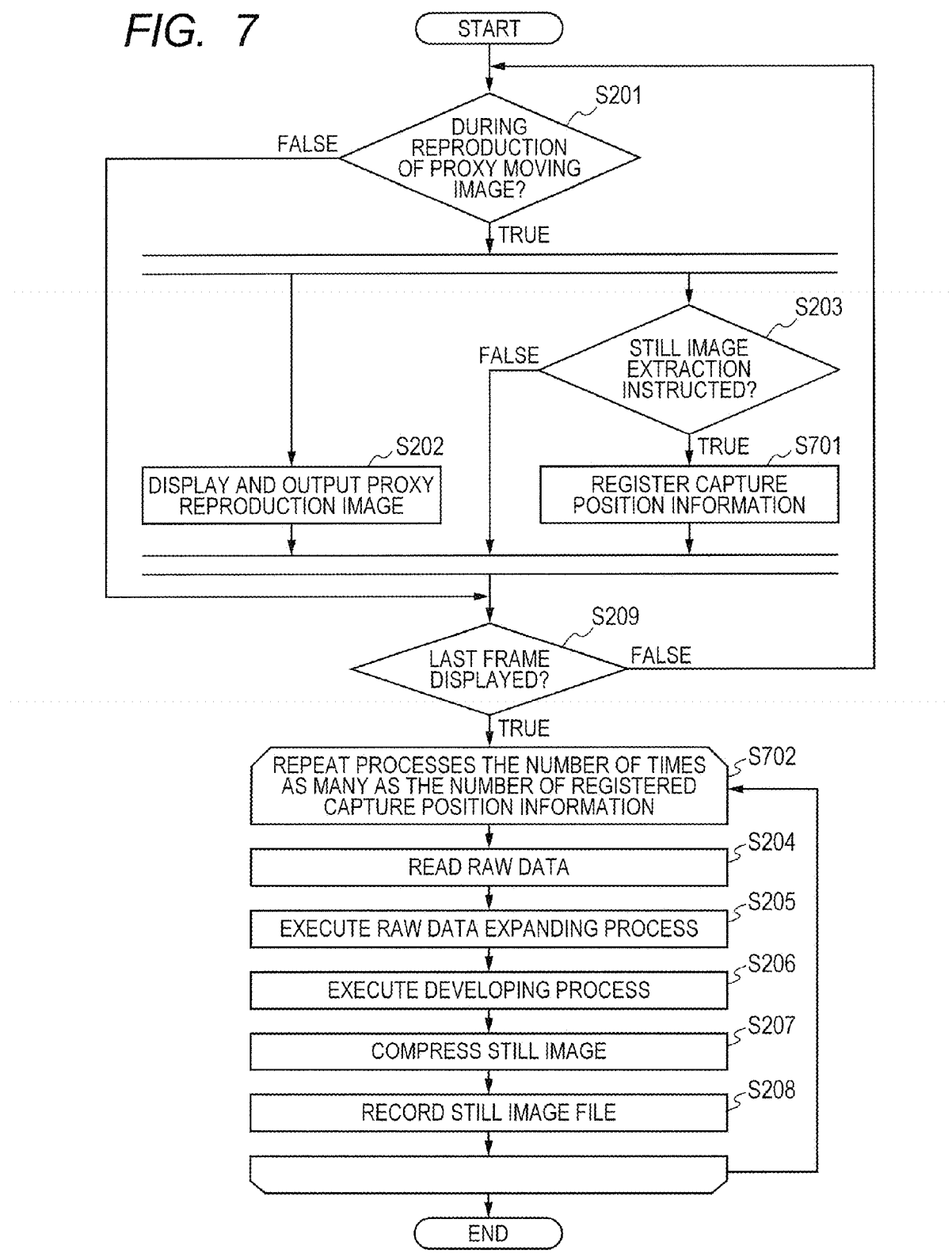
FIG. 7 is a flowchart illustrating the image processing method according to the second embodiment of the present invention.
Figure 8:
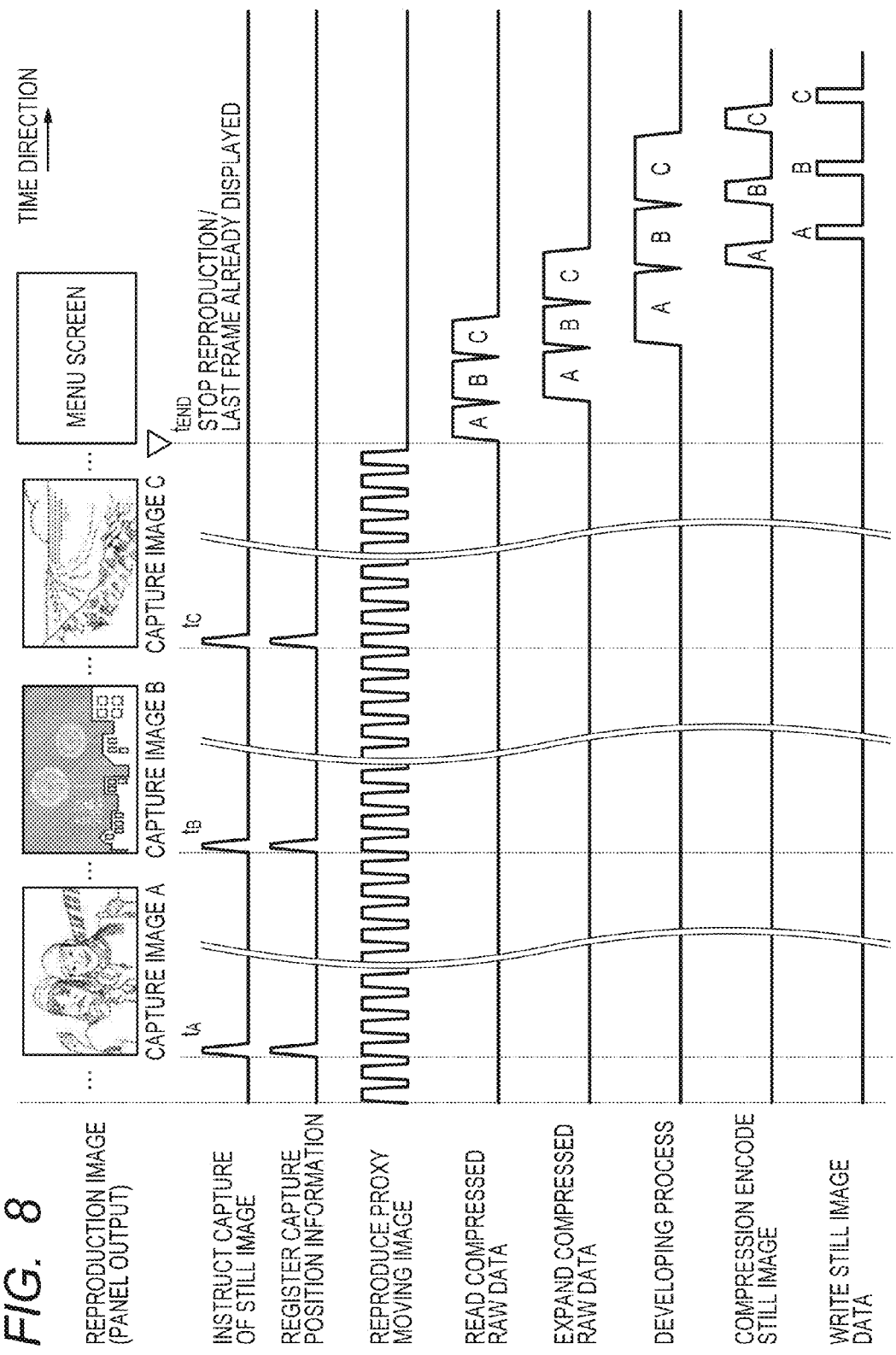
FIG. 8 is a diagram illustrating operation timing and a transition of an output screen in the image processing method according to the second embodiment of the present invention.

FIG. 5 is a block diagram illustrating a schematic construction of the image recording and reproducing apparatus according to the present embodiment. FIG. 6 is a diagram illustrating a data structure of capture position information in an image processing method according to the present embodiment. FIG. 7 is a flowchart illustrating the image processing method according to the present embodiment. FIG. 8 is a diagram illustrating operation timing and a transition of an output screen in the image processing method according to the present embodiment.

In the first embodiment, the method whereby the RAW image data at the same time position as that of the frame image which is being displayed and output is developed at the timing when the user has made the capture instruction during the reproduction of the proxy moving image and the still image of the high precision is captured has been described.

In the present embodiment, the image recording and reproducing apparatus and the image processing method having such a construction that after the reproduction of a proxy moving image was stopped, frame images to which a capture instruction has been made are read out during the reproduction of the proxy moving image and the still images are captured in a lump will be described.

<System Construction>

A system construction of the image recording and reproducing apparatus according to the present embodiment will be described with reference to FIG. 5.

As illustrated in FIG. 5, the image recording and reproducing apparatus 100 according to the present embodiment further includes a capture position information storing unit 501 in addition to the construction of the image recording and reproducing apparatus 100 according to the first embodiment illustrated in FIG. 1.

The capture position information storing unit 501 has such a function that when the user makes the capture instruction during the reproduction of the proxy moving image, frame position information of the RAW moving image data at the same time as that of the display output frame of the proxy moving image is formed, stored, and held. The capture position information storing unit 501 is connected to the system control unit 113 and the operation is controlled by the system control unit 113. The system control unit 113 can control other functional blocks on the basis of the capture position information stored in the capture position information storing unit 501.

FIG. 6 is an example of the data structure of the capture position information stored in the capture position information storing unit 501. The capture position information in FIG. 6 includes a name of a capture target RAW moving image file and the number of capture designated frames. The capture position information also includes offset addresses and data sizes of the number as many as the number of frames. That is, the offset addresses and the data sizes are shown in a list structure, and each offset address is an address from a file head of the position where the capture designated frame image data has been stored.

The capture position information is formed by a method whereby when the capture instruction is received during the reproduction of the proxy moving image, on the basis of the instruction of the system control unit 113, the address information and the data size at the capture instructed frame position are extracted with reference to the access management information.

Since other functional blocks are similar to those in the first embodiment, their detailed description is omitted here.

<Processing Flow>

The image processing method according to the present embodiment will now be described with reference to FIG. 7.

The image processing method according to the present embodiment includes a processing flow illustrated in FIG. 7. In steps S201 to S209 in the processing flow illustrated in FIG. 7, the same processes as those in steps S201 to S209 in the processing flow in the first embodiment illustrated in FIG. 2 are executed. Therefore, a description of the processes in steps S201 to S209 is properly omitted.

First, in step S201, whether or not the present system operating state is a state during the reproduction of the proxy moving image data is discriminated. If the present operating state is not the state during the reproduction of the proxy moving image data, that is, if it is a state during the recording of the RAW moving image data, a state during the recording of the still image, or the like (that is, FALSE in step S201), the processing routine advances to step S209. In the case of the state during the reproduction of the proxy moving image (that is, TRUE in step S201), as a normal operation, the moving image data is decoded and the decoded image is obtained by the moving image expanding unit 107. Such an operation that the image process is executed in the display processing unit 105 and, thereafter, the resultant image data is output to the display unit 110 is executed on a frame unit basis in a real time manner (step S202).

Further, in the image processing method according to the present embodiment, processing steps of steps S203 and S701 are executed on a background in parallel with the processing step of step S202. That is, the parallel processes of the processing step of step S202 and the processing steps of steps S203 and S701 are executed.

In step S203, with respect to the image data which is being displayed and output at present, whether or not the capture instruction has been issued from the user is discriminated.

If the capture instruction is not issued (FALSE in step S203), the processing routine advances to step S209.

If the capture instruction has been issued (TRUE in step S203), step S701 follows. The frame position information of the RAW moving image locating at the same time as that of the proxy image which is being displayed when the capture instruction is issued is registered into the capture position information storing unit 501. For example, the capture position information data of the data format illustrated in FIG. 6 is registered into the capture position information storing unit 501. After that, step S209 follows.

In step S209, whether or not the display output of the proxy image has reached an end of the file or the reproduction stop instruction has been received by the user operation and the frame image is the last frame image is discriminated. If the proxy image data which is decoded, displayed, and output in the next frame period still remains (FALSE in step S209), the processing routine advances to step S201 and the foregoing processing steps are repeated. If the frame image is the last frame image (TRUE in step S209), the processing routine advances to step S702.

In step S702, the processes in subsequent steps S204 to S208 are repeatedly executed the number of times as many as the number of capture position information registered in step S701. At this time, in step S204, only the RAW moving image data to be still image captured is read out with reference to the capture position information registered in step S701. In this manner, the still image file is generated from the RAW moving image data at the position corresponding to each capture instruction and is registered as a recording file into the recording medium 112.

Although not shown in this processing flow, after execution of this processing flow, a process to annul the capture position information is executed as an end process. Thus, such a situation that in the case where the same file was reproduced again, although the capture instruction is not made, the capture operation is performed by using the previous registration information can be prevented.

As mentioned above, the processing flow in the image processing method according to the present embodiment is executed.

<Example of Application>

An example of the operation in the case where the foregoing operating flow according to the present embodiment is applied will be described with reference to FIG. 8.

FIG. 8 illustrates operating states of the following items to the time direction: that is, an output screen of the reproduction image; an instruction of the capture of the still image; a reproduction of the proxy moving image; a reading of the compressed RAW data; an expansion of the compressed RAW data; a developing process; a compression encoding of the still image; and a writing of the still image data. Timing for executing the registering process of the capture position information in step S701 is also illustrated in FIG. 8.

In the image processing method according to the present embodiment, such an operation that the processes in a range from the reading of the RAW data to the recording of the still image just after the reception of the instruction are executed on a background by using the capture instruction as a trigger is not executed but a series of capture processes are executed in a lump after completion of the reproduction of the proxy moving image.

In the example of FIG. 8, the capture position information is additionally registered into the capture position information files at timing (time $t_A$, $t_B$, $t_C$) when the capture instruction has been made to the capture images A, B, and C. The capture images A, B, and C are generated in a lump with reference to the capture position information for a period of time during which a temporary stop display of the last frame image or the menu screen is displayed on the panel screen from a point of time (time $t_{END}$) when the reproduction of the proxy moving image has been stopped.

By realizing such processes, the still image capture of a high picture quality can be realized without stopping the reproduction of the proxy moving image in a manner similar to the first embodiment.

As mentioned above, according to the present embodiment, the still image data of a high precision at a desired frame position selected by the user can be developed and generated from the RAW image without temporarily stopping the operation during the reproduction of the moving image.

Third Embodiment

An image recording and reproducing apparatus and an image processing method according to a third embodiment of the present invention will be described with reference to FIGS. 9 and 10. Component elements similar to those in the image recording and reproducing apparatus and the image processing method according to each of the first and second embodiments illustrated in FIGS. 1 to 8 are designated by the same reference numerals and characters and their detailed description is omitted or simplified.

Figure 9:
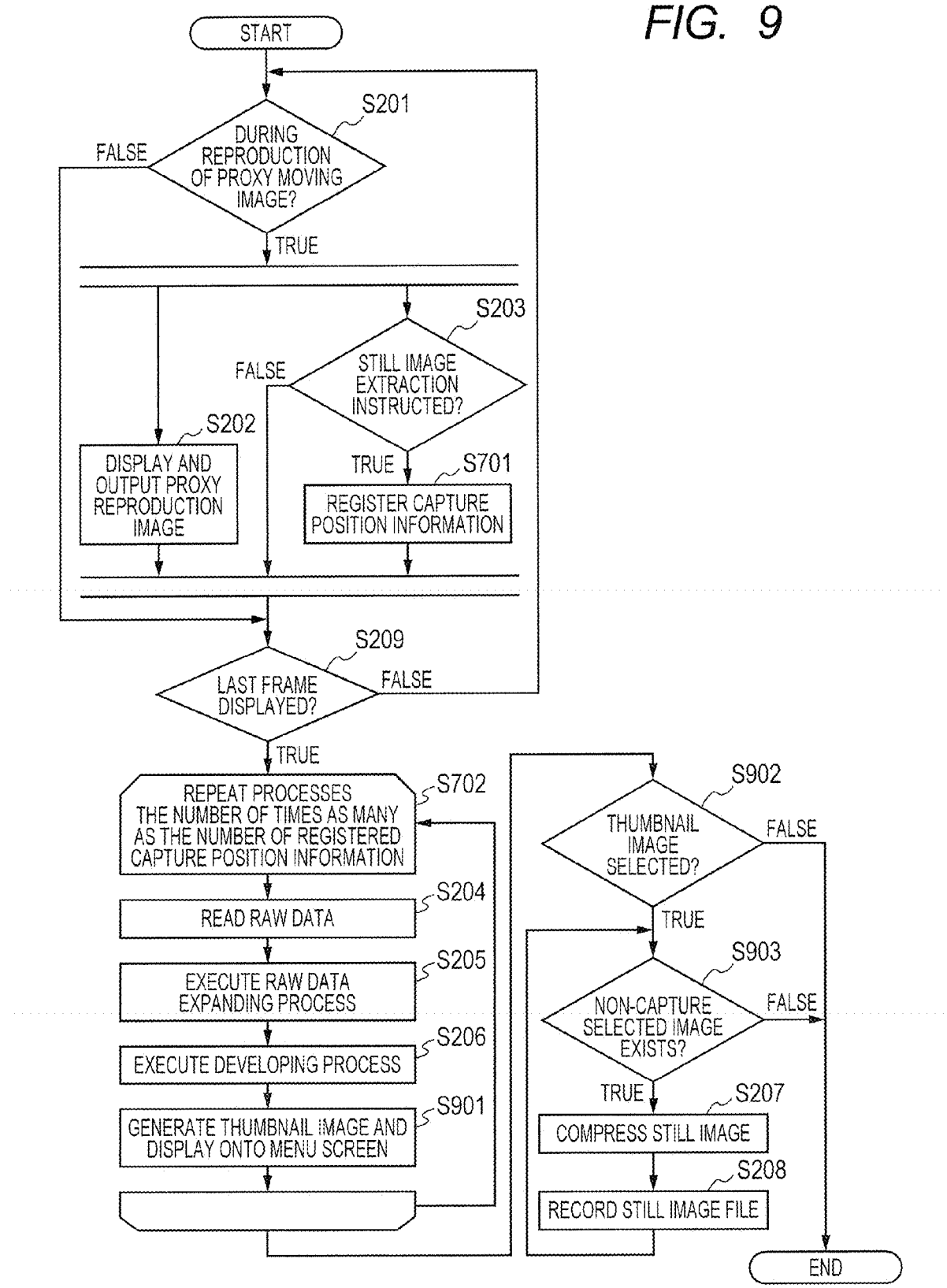
FIG. 9 is a flowchart illustrating an image processing method according to a third embodiment of the present invention.

FIG. 9 is a flowchart illustrating the image processing method according to the present embodiment. FIG. 10 is a diagram illustrating operation timing and a transition of an output screen in the image processing method according to the present embodiment.

In the second embodiment, the method whereby when the still image capture instruction has been made, the capture position information is generated and registered, and when the reproduction is ended, the still image capture is executed in a lump later with reference to the position information has been described.

In the present embodiment, the image recording and reproducing apparatus and the image processing method having such a construction that after the end of the reproduction, thumbnail images of the capture images are displayed as a menu screen and only the capture image corresponding to the selected thumbnail image is encoded and stored into the recording medium will be described. According to such a construction, even after the user made the capture instruction during the reproduction, by preparing a selecting display screen through the thumbnail display, the images in which the capture instruction timing failed are eliminated, only the real favorite images can be captured, and a usability is improved.

<System Construction>

Since a fundamental system construction of the image recording and reproducing apparatus according to the present embodiment is similar to that of the image recording and reproducing apparatus according to the second embodiment illustrated in FIG. 5, its detailed description is omitted here.

<Processing Flow>

The image processing method according to the present embodiment will be described with reference to FIG. 9.

The image processing method according to the present embodiment includes a processing flow illustrated in FIG. 9. In steps S201 to S209, S701, and S702 in the processing flow illustrated in FIG. 9, substantially the same processes as those in steps S201 to S209, S701, and S702 in the processing flow in the second embodiment illustrated in FIG. 7 are executed. Therefore, a description of the processes in steps S201 to S209 is properly omitted here.

In an image converting method according to the present embodiment, the processes up to step S209 are similar to those of the image converting method according to the second embodiment.

In step S702, the processing steps of steps S204, S205, S206, and S901 are repeatedly executed the number of times as many as the number of capture position information registered in step S701.

In step S204, only the RAW moving image data to be still image captured is read out with reference to the capture position information registered in step S701.

In step S205, the read RAW image data is decoded and expanded into the Bayer data (RAW image data) again by the RAW expanding unit 103.

In step S206, the developing process of the RAW image data corresponding to the decoded capture instructed frame images is executed in the developing unit 102.

In step S901, in the display processing unit 105, a thumbnail image obtained by executing a reducing process to the developed data is formed and output to a capture image deciding menu screen which is displayed after the stop of the reproduction. After the thumbnail images of the number as many as the number of registered capture position information were obtained, the processing routine advances to step S902.

In step S902, whether or not the thumbnail image selected when the capture is executed by the user operation exists among the thumbnail images displayed on the capture image deciding menu screen is discriminated. An association between the thumbnail images and the developed image data serving as an original image is stored in a memory (not illustrated) in the system control unit 113. A GUI icon by which the user can select the decision or cancellation of the capture execution every thumbnail image may be provided on the panel screen.

In the case where although there are one or more capture instructed images during the reproduction of the proxy moving image, there are no favorite images on the thumbnail displayed menu screen and the thumbnail image is not selected (FALSE in step S902), the capture process is not executed but the processing flow is ended. On the other hand, if there is the capture image deciding instruction by the selection of the thumbnail image (TRUE in step S902), the processing routine advances to step S903.

In step S903, until the capture process for setting the corresponding developed image data into the still image file is completed with respect to all of the selected thumbnail images, the processes of steps S207 and S208 are repeatedly executed.

In step S207, the developed data is transferred to the still image compressing unit 108 and information of the still image data is compressed by using the well-known still image encoding system. In step S208, the still image encoded image data is written as a recording file into the recording medium 112 through the recording and reproducing unit 111.

When the capture process to the developed image data corresponding to all of the selected thumbnail images is completed (FALSE in step S903), the processing flow is ended.

As mentioned above, the processing flow in the image processing method according to the present embodiment is executed.

<Example of Application>

An example of the operation in the case where the foregoing processing flow according to the present embodiment is applied will be described with reference to FIG. 10.

Figure 10:
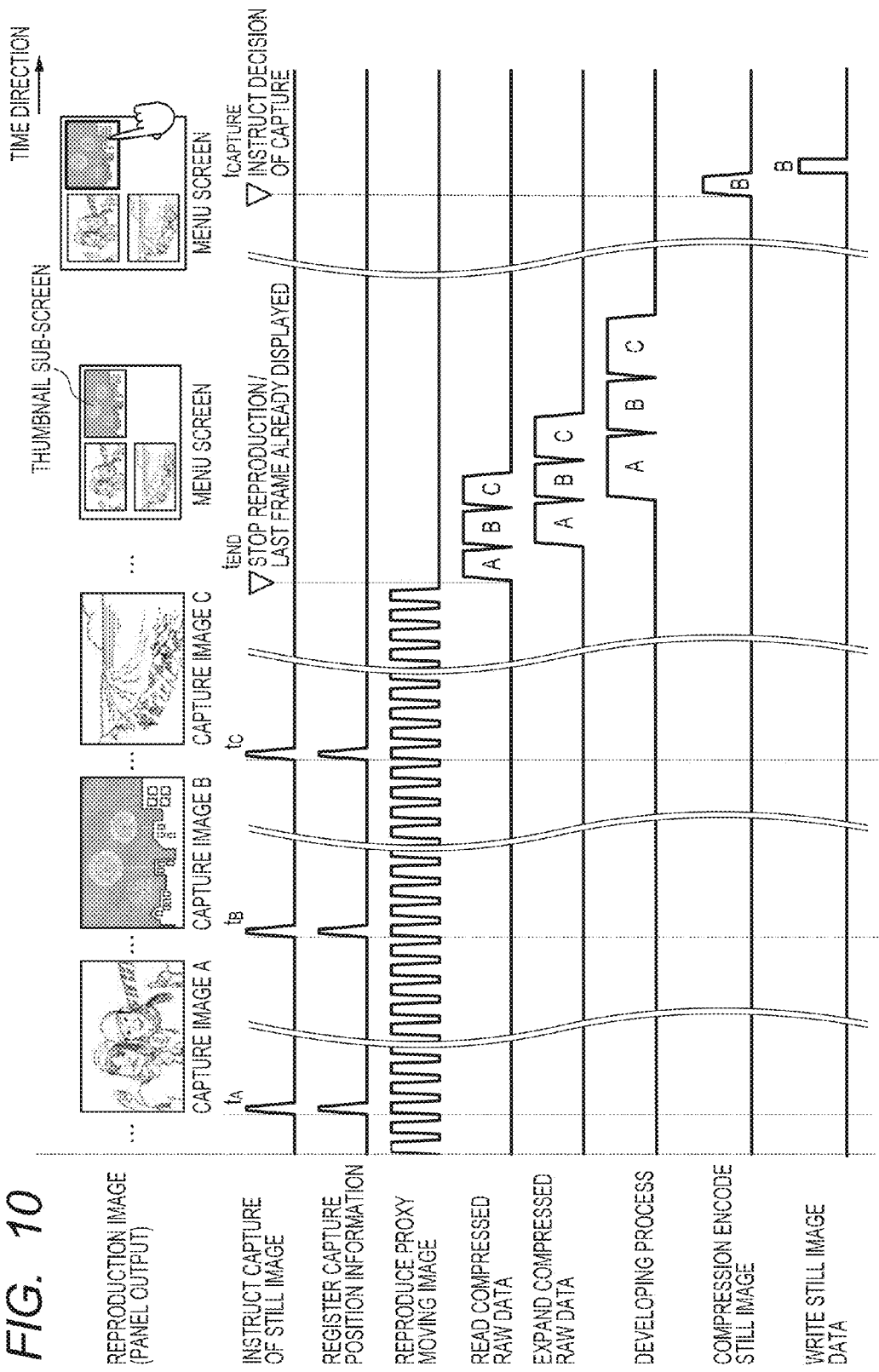
FIG. 10 is a diagram illustrating operation timing and a transition of an output screen in the image processing method according to the third embodiment of the present invention.

FIG. 10 illustrates operating states of the following items to the time direction: that is, an output screen of the reproduction image; an instruction of the capture of the still image; a registration of the capture position information; a reproduction of the proxy moving image; a reading of the compressed RAW data; an expansion of the compressed RAW data; a developing process; a compression encoding of the still image; and a writing of the still image data.

In the example of FIG. 10, the capture position information is registered at the timing (time $t_A$, $t_B$, $t_C$) when the capture instruction has been made to the capture images A, B, and C during the reproduction of the proxy moving image in a manner similar to the case of the second embodiment illustrated in FIG. 8.

In the present embodiment, although the reading of the RAW image data is started from the point of time (time $t_{END}$) when the reproduction of the proxy moving image has been stopped, at a point of time when the developing process of the capture images has been completed, the thumbnail images are generated from the respective developed image data and are displayed onto the menu screen.

In the example of FIG. 10, the thumbnail images of the capture images A, B, and C are displayed onto the menu screen at the time of completion of the development. From a point of time (time $t_{CAPTURE}$) when the user has selected the capture image B from the plurality of thumbnail images, the developed image data generated from the RAW moving image serving as an original image of the selected thumbnail image is still image encoded and written into the recording medium.

By providing a discriminating unit for selecting and deciding the images one by one after the stop of the reproduction as mentioned above, such a situation that the wrong capture image is generated by the erroneous operation of the user can be avoided.

As mentioned above, according to the present embodiment, the still image data of a high precision at a desired frame position selected by the user can be developed and generated from the RAW image without temporarily stopping the operation during the reproduction of the moving image. Only the favorite images of the user can be captured and usability can be improved.

Fourth Embodiment

An image recording and reproducing apparatus and an image processing method according to a fourth embodiment of the present invention will be described with reference to FIGS. 11 and 12. Component elements similar to those in the image recording and reproducing apparatus and the image processing method according to each of the first to third embodiments illustrated in FIGS. 1 to 10 are designated by the same reference numerals and characters and their detailed description is omitted or simplified.

Figure 11:
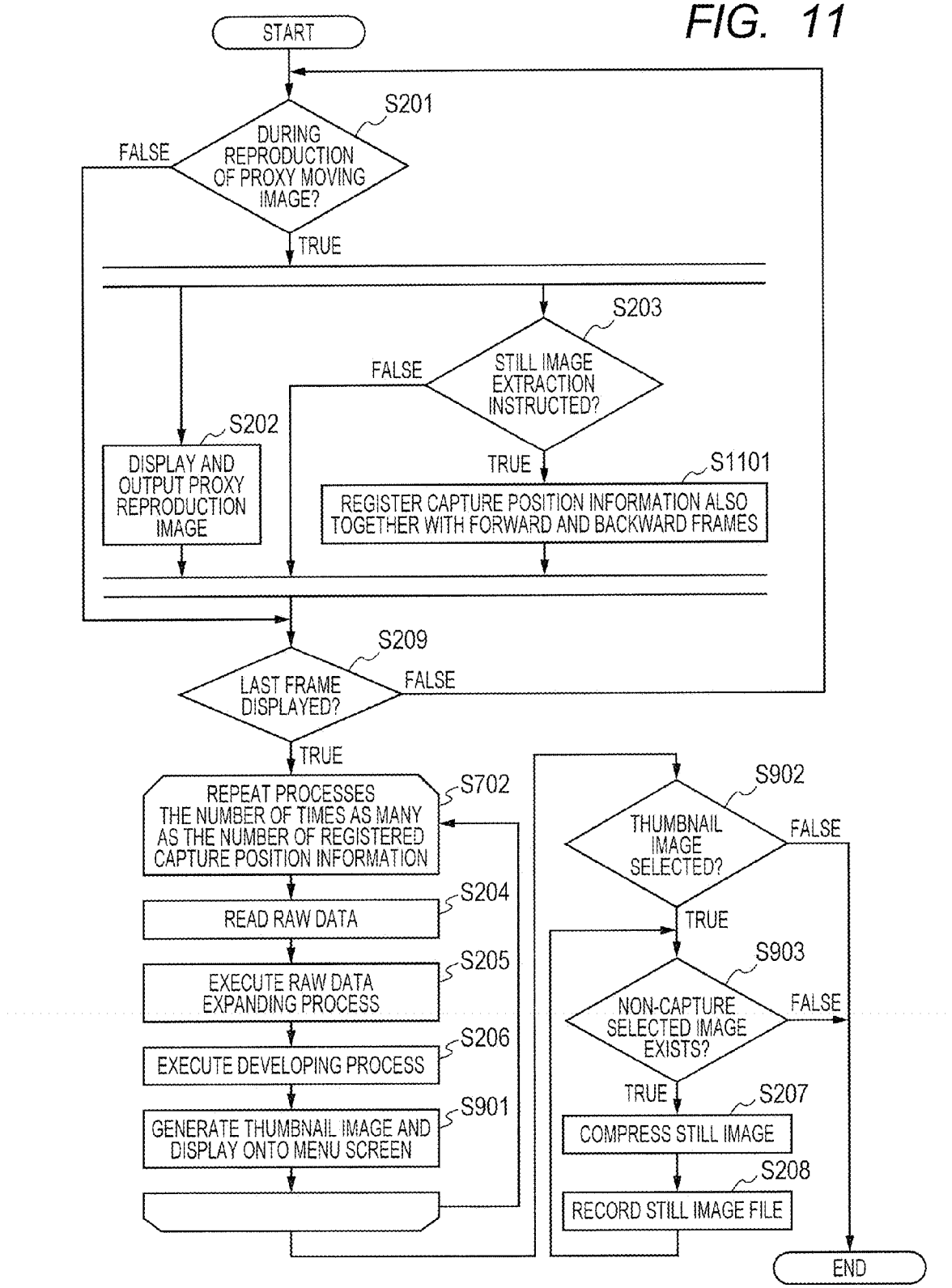
FIG. 11 is a flowchart illustrating an image processing method according to a fourth embodiment of the present invention.

FIG. 11 is a flowchart illustrating the image processing method according to the present embodiment. FIG. 12 is a diagram illustrating operation timing and a transition of an output screen in the image processing method according to the present embodiment.

In the third embodiment, the method whereby after completion of the reproduction of the proxy moving image, the thumbnail images of the capture instructed image data are generated and menu displayed, and only the image data selected and decided by the user is still image encoded and capture processed has been described.

In the present embodiment, when the capture instruction by the user operation is received, in addition to the frame image which has been displayed and output at the instruction timing, also with respect to the image data corresponding to the frames which are continuous in the time direction, the capture position information is registered. On the basis of those capture position information, the thumbnail images at the frame position of the capture instruction timing and the forward and backward frame positions are displayed and output on the menu screen. Only the capture images of the thumbnails selected by the user are encoded and stored into the recording medium. Therefore, even if picture qualities and compositions of the image at the instruction timing presumed by the user such as a scene in which an object motion speed of the contents is high or the like and the actual capture image differ, the capture positions can be adjusted by using the forward and backward frames. Thus, only the real favorite images can be captured and usability is improved.

<System Construction>

Since a fundamental system construction of the image recording and reproducing apparatus according to the present embodiment is similar to that of the image recording and reproducing apparatus according to each of the second and third embodiments illustrated in FIG. 5, its detailed description is omitted here.

<Processing Flow>

The image processing method according to the present embodiment will be described with reference to FIG. 11.

The image processing method according to the present embodiment includes a processing flow illustrated in FIG. 11. The processing flow illustrated in FIG. 11 is substantially the same as that in the image processing method according to the third embodiment illustrated in FIG. 9 except that a process of step S1101 is executed in place of the process of step S701.

A fundamental process of step S1101 is similar to that of step S701 in the second and third embodiments. In step S1101, in addition to a data storing address and size information of the RAW moving image corresponding to the capture instructed frame image, data storing addresses and size information of the RAW moving images corresponding to the frame images before and after such a frame image are also registered as capture position information.

By applying the capture position information generated as mentioned above and executing processes after step S702, the image data of the RAW moving images corresponding to the frame images locating at the forward and backward positions in addition to the frame image of the capture instruction timing is preliminarily developed.

The image data of the frame image at the capture instruction timing generated as mentioned above and the image data of the frame images before and after such a frame image are processed in step S901 and displayed onto the menu screen. Thus, after the user confirmed the thumbnail menu screen, if the images of the favorite composition and picture quality exist in the images locating at the forward and backward positions different from the capture instruction timing, the user can select and capture such favorite images.

Although the present embodiment has been described on the assumption that three images comprising the present frame image, one forward frame image, and one backward frame image are preliminarily developed in response to one capture instruction, it is not always necessary to construct in such a manner that three images are preliminarily developed in response to one capture instruction. If a storing capacity of a memory such as a DRAM or the like (not illustrated) provided in the image recording and reproducing apparatus is large, a larger number of capture candidate images can be temporarily held.

It is not always necessary to use both of the frame images locating at the positions before and after the capture instructed frame, but only either one of those frame images may be used. In place of the forward and backward frame images, the frame image locating at a position away from the capture instructed frame by a predetermined frame interval (for example, two frames) may be used.

As mentioned above, the processing flow in the image processing method according to the present embodiment is executed.

<Example of Application>

An example of the operation in the case where the foregoing operating flow according to the present embodiment is applied will be described with reference to FIG. 12.

Figure 12:
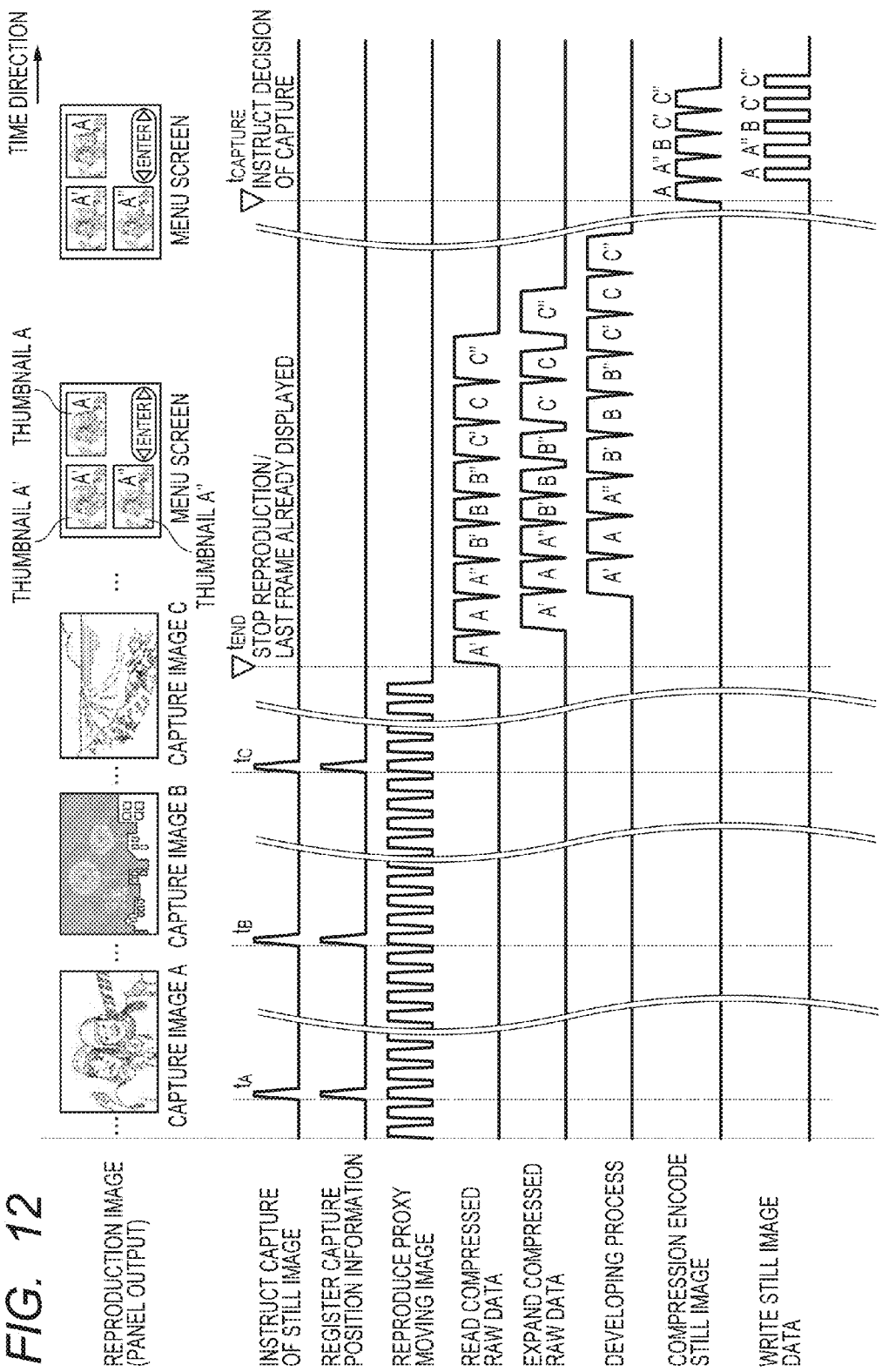
FIG. 12 is a diagram illustrating operation timing and a transition of an output screen in the image processing method according to the fourth embodiment of the present invention.

In the example of FIG. 12, the capture position information is also registered at the timing (time $t_A$, $t_B$, $t_C$) when the capture instruction has been made to the capture images A, B, and C during the reproduction of the proxy moving image with respect to the RAW moving image data of the frames locating at the positions before and after the capture instruction timing. In this instance, it is assumed that image data of the forward frame of the capture image A is shown by A' and image data of the backward frame is shown by A". A similar expression system is applied and with respect to the capture image B, it is assumed that image data of the forward frame is shown by B' and image data of the backward frame is shown by B". Likewise, with respect to the capture image C, it is assumed that image data of the forward frame is shown by C' and image data of the backward frame is shown by C".

After the timing (time $t_{END}$) when the reproduction of the proxy moving image has been stopped, by referring to the capture position information, with respect to the nine images A' to C", a series of processes from the process for sequentially reading out the RAW data to the developing process are continuously executed and a thumbnail menu is formed.

In the example of FIG. 12, the thumbnails of the three capture candidate images A, A', and A" are displayed as panel output images, and the user can capture select only desired images while confirming the relevant display screen. After the capture images were selected and decided, with respect to the five selected and decided images A, A", B, C', and C", the still image encoding and the writing into the recording medium are continuously executed from the timing $t_{CAPTURE}$ by using the developed image data which was temporarily stored.

By realizing the processes as mentioned above, the capture images closer to the image presumed by the user can be obtained.

As mentioned above, according to the present embodiment, the still image data of a high precision at a desired frame position selected by the user can be developed and generated from the RAW image without temporarily stopping the operation during the reproduction of the moving image. The user can capture only the favorite images and the usability can be improved.

Fifth Embodiment

An image recording and reproducing apparatus and an image processing method according to a fifth embodiment of the present invention will be described with reference to FIGS. 13 to 15. Component elements similar to those in the image recording and reproducing apparatus and the image processing method according to each of the first to fourth embodiments illustrated in FIGS. 1 to 12 are designated by the same reference numerals and characters and their detailed description is omitted or simplified.

Figure 13:
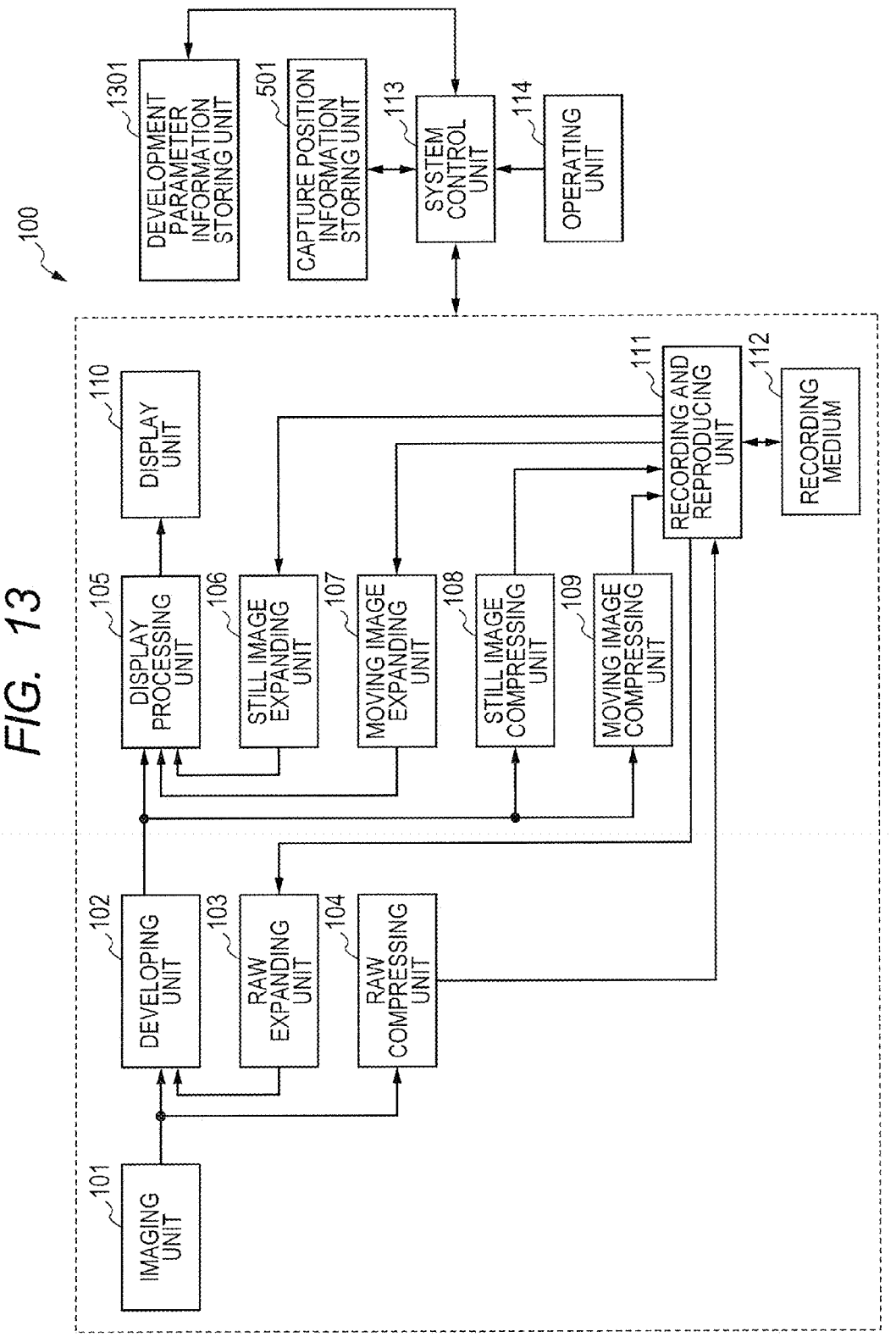
FIG. 13 is a block diagram illustrating a schematic construction of an image recording and reproducing apparatus according to a fifth embodiment of the present invention.

FIG. 13 is a block diagram illustrating a schematic construction of the image recording and reproducing apparatus according to the present embodiment. FIG. 14 is a flowchart illustrating the image processing method according to the present embodiment. FIG. 15 is a diagram illustrating an example of a panel output in the image processing method according to the present embodiment.

In the fourth embodiment, at the capture instruction timing during the reproduction of the proxy moving image, in addition to the frame image which is being displayed and output, the frame images existing at the positions before and after the position of such a frame image are also development processed, thereby enabling the user to select the more desirable image later.

In the present embodiment, the image recording and reproducing apparatus and the image processing method in which simultaneously with the capture instruction timing during the reproduction of the proxy moving image, the user can select development parameters at the time of development processing the capture image from the preliminarily prepared parameter set will be described.

<System Construction>

A system construction of the image recording and reproducing apparatus according to the present embodiment will be described with reference to FIG. 13.

As illustrated in FIG. 13, in addition to the construction of the image recording and reproducing apparatus 100 according to the second embodiment illustrated in FIG. 5, the image recording and reproducing apparatus 100 according to the present embodiment further includes a development parameter information storing unit 1301.

The development parameter information storing unit 1301 has a function for generating parameter information at the time of development processing the undeveloped RAW image data at the capture position associated with the capture position information held in the capture position information storing unit 501 and storing and holding the parameter information. As for the development parameter information, it is assumed that adjustment parameters of a γ adjustment, a white balance adjustment, and various kinds of filter processes which can be adjusted within a performance range of the developing process provided for the developing unit 102 are defined as one or more developing modes.

The development parameter information storing unit 1301 is connected to the system control unit 113 and its operation is controlled by the system control unit 113. The system control unit 113 can control the developing unit 102 on the basis of the development parameter information stored in the development parameter information storing unit 1301.

The display processing unit 105 has a function for OSD displaying the developing modes in such a format that they can be intuitively viewed by a graphics display or the like such as an icon or the like in addition to operation information for the image capture instruction during the reproduction of the proxy moving image.

Figure 15:
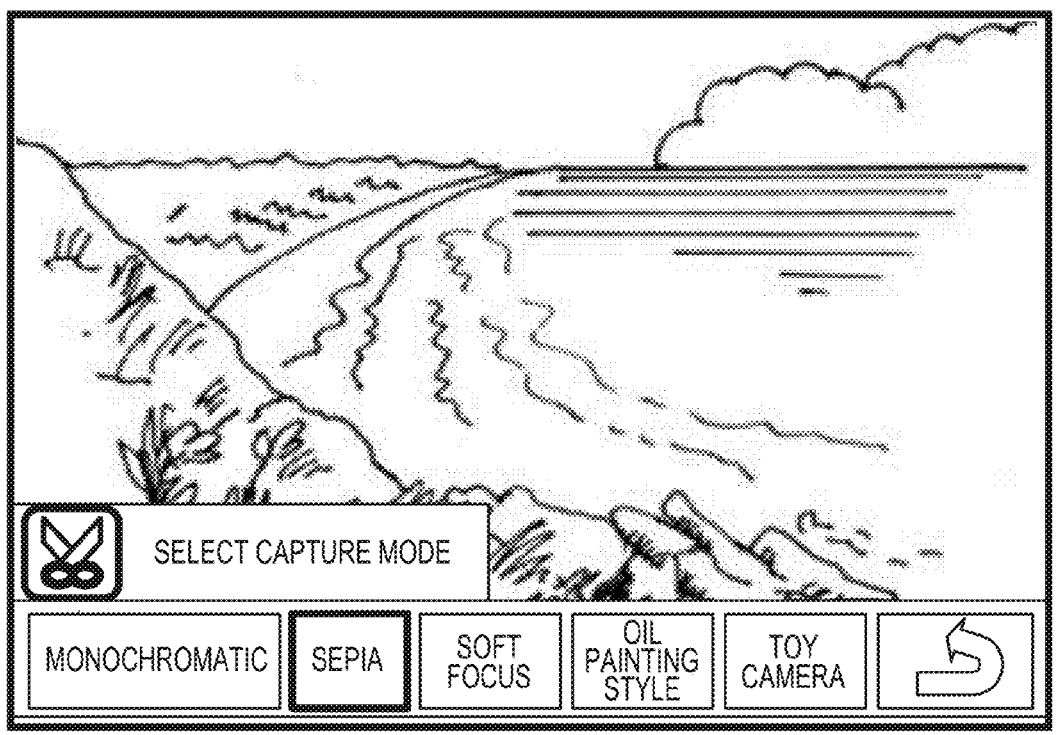
FIG. 15 is a diagram illustrating an example of a panel output in the image processing method according to the fifth embodiment of the present invention.

FIG. 15 illustrates an example of a panel output screen at the time of the capture image selection. In this example, a format in which the user can intuitively presume and discriminate an output result of the developed capture image like "monochromatic", "sepia", "soft focus", or the like is used instead of such an interface that various kinds of parameter setting values associated with the developing process can be finely set one by one.

Since other functional blocks are similar to those in the second embodiment, their detailed description is omitted here.

<Processing Flow>

The image processing method according to the present embodiment will be described with reference to FIG. 14.

Figure 14:
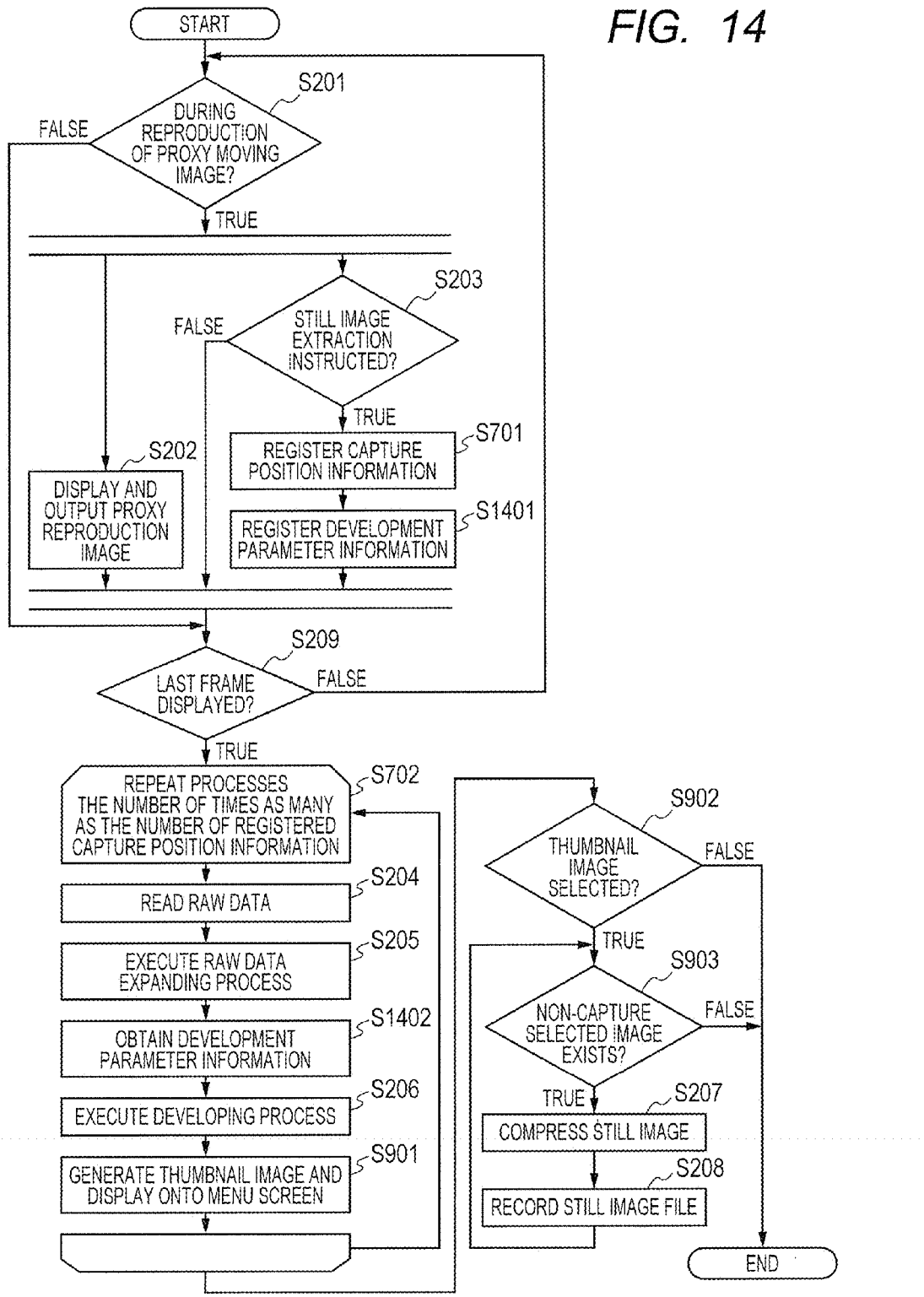
FIG. 14 is a flowchart illustrating an image processing method according to the fifth embodiment of the present invention.

The image processing method according to the present embodiment includes a processing flow illustrated in FIG. 14. The processing flow illustrated in FIG. 14 is substantially the same as that in the image processing method according to the third embodiment illustrated in FIG. 9 except that step S1401 is provided after step S701 and step S1402 is provided between steps S205 and S206.

In step S1401, simultaneously with the capture instruction, a development parameter mode selected by the user is obtained through an interface screen as illustrated in FIG. 15 and parameter information which is set into the developing unit is generated and registered by the development parameter information storing unit 1301.

In step S1402, parameter values of the developing process which is executed to the undeveloped image data which was expansion processed in step S205 are obtained with reference to the development parameter information storing unit 1301.

In next step S206, the developing process is executed by using the parameter values obtained in step S1402.

As mentioned above, the processing flow in the image processing method according to the present embodiment is executed.

By applying the present embodiment, a degree of freedom of the developing process of the RAW image data is improved and the user can easily execute the generation of the capture images subjected to various kinds of photographing effects and the filter process in the image processing apparatus main body without editing the still image data later.

As mentioned above, according to the present embodiment, the still image data of a high precision at a desired frame position selected by the user can be developed and generated from the RAW image without temporarily stopping the operation during the reproduction of the moving image. The degree of freedom of the developing process of the RAW image data is improved and the user can easily execute the generation of the capture images subjected to the various kinds of photographing effects and the filter process in the image processing apparatus main body without editing the still image data later.

Sixth Embodiment

An image recording and reproducing apparatus and an image processing method according to a sixth embodiment of the present invention will be described with reference to FIGS. 16 to 18D. Component elements similar to those in the image recording and reproducing apparatus and the image processing method according to each of the first to fifth embodiments illustrated in FIGS. 1 to 15 are designated by the same reference numerals and characters and their detailed description is omitted or simplified.

Figure 16:
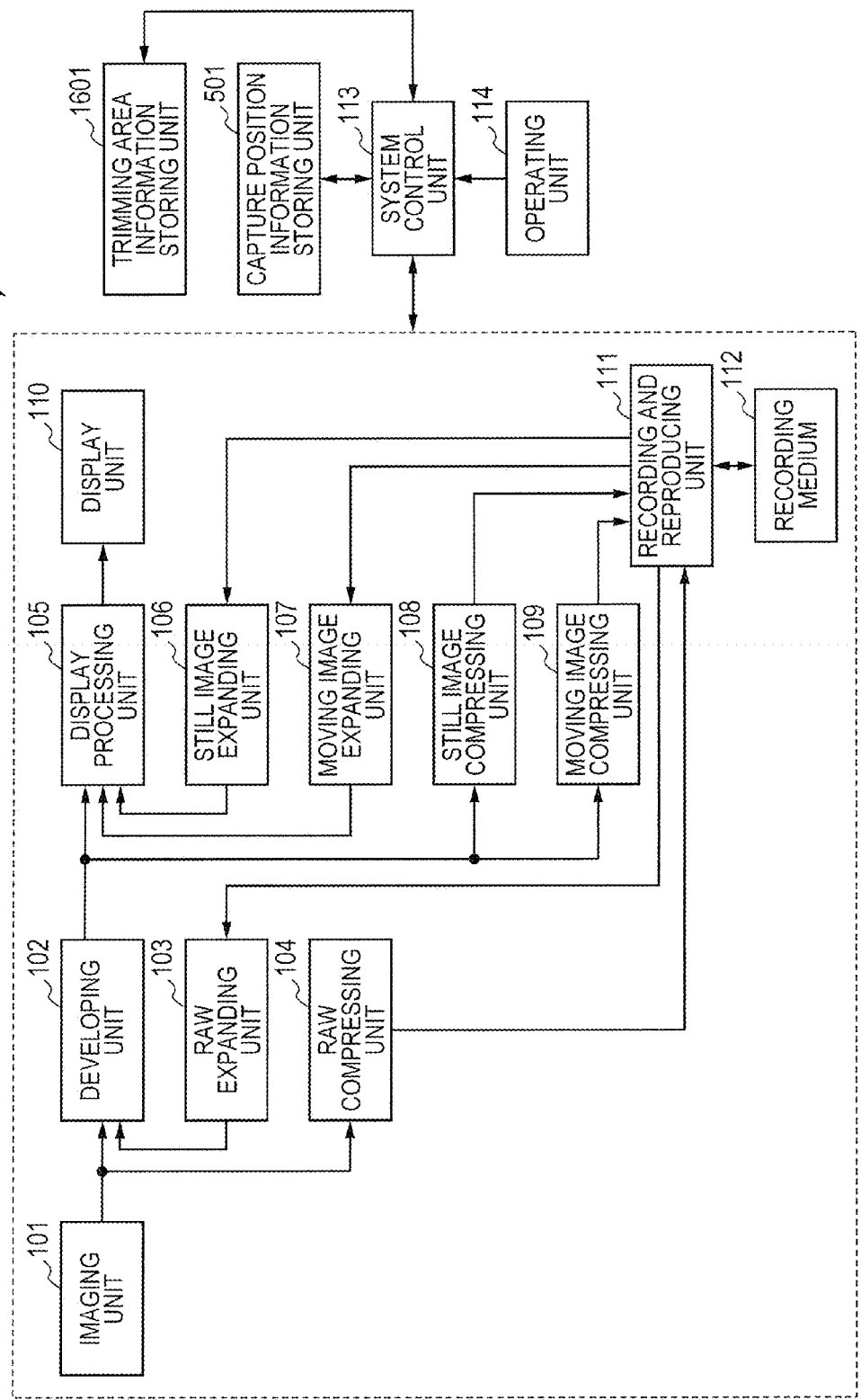
FIG. 16 is a block diagram illustrating a schematic construction of an image recording and reproducing apparatus according to a sixth embodiment of the present invention.
Figure 17:
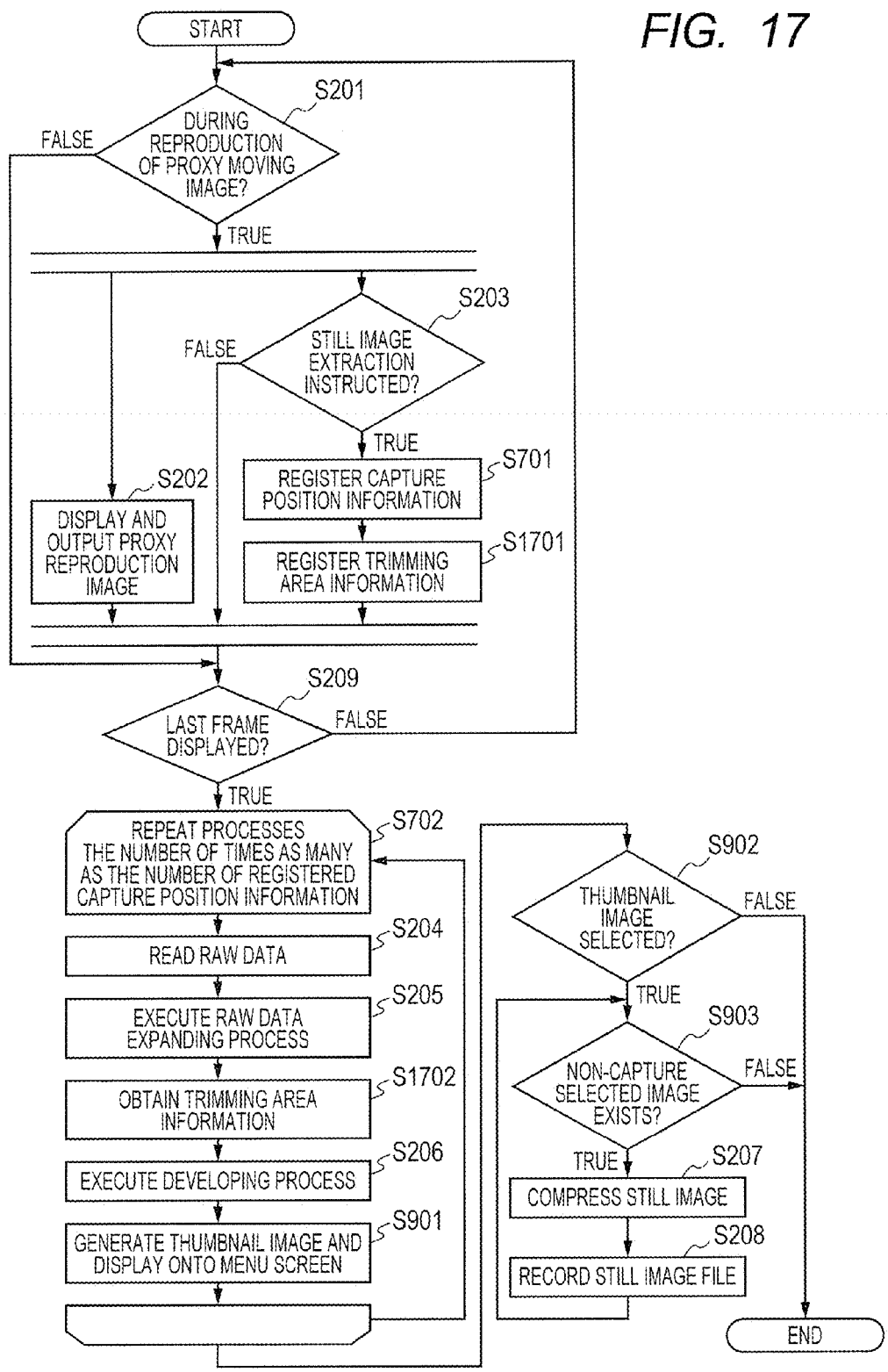
FIG. 17 is a flowchart illustrating an image processing method according to the sixth embodiment of the present invention.

FIG. 16 is a block diagram illustrating a schematic construction of the image recording and reproducing apparatus according to the present embodiment. FIG. 17 is a flowchart illustrating the image processing method according to the present embodiment. FIGS. 18A to 18D are diagrams illustrating examples of a panel output in the image processing method according to the present embodiment.

In the fifth embodiment, the method whereby simultaneously with the capture instruction timing during the reproduction of the proxy moving image, the user can select the development parameters at the time of development processing the capture image from the preliminarily prepared parameter set has been described.

In the present embodiment, the image recording and reproducing apparatus and the image processing method in which simultaneously with the capture instruction timing during the reproduction of the proxy moving image, the user can select a trimming area at the time of development processing the capture image from preliminarily prepared screen area information will be described.

By applying the present embodiment, since an editing process for extracting only a desired area in the display screen and still image capturing can be executed by the simple operation in the image recording and reproducing apparatus main body, such a complicated operation that the user edits the still image data later becomes unnecessary.

<System Construction>

A system construction of the image recording and reproducing apparatus according to the present embodiment will be described with reference to FIG. 16.

As illustrated in FIG. 16, in addition to the construction of the image recording and reproducing apparatus 100 according to the second embodiment illustrated in FIG. 5, the image recording and reproducing apparatus 100 according to the present embodiment further includes a trimming area information storing unit 1601.

The trimming area information storing unit 1601 generates and holds trimming information in which a development area in the image data is designated at the time of development processing the undeveloped RAW image data at the capture position associated with the capture position information held in the capture position information storing unit 501. As trimming information, one or more of capture area modes such as "all (no trimming)", "face area", and "focus area" in which extraction areas at the time of capturing can be selected can be defined. Only arbitrary image areas are developed from the undeveloped RAW image data in accordance with the selected capture mode by referring to information in which the face detection and focus area in an image processing unit (not illustrated) of the image processing apparatus have been recorded as camera information in a meta data format such as EXIF or the like.

The trimming area information storing unit 1601 is connected to the system control unit 113 and its operation is controlled by the system control unit 113. The system control unit 113 can control the developing unit 102 on the basis of the capture position information stored in the trimming area information storing unit 1601.

The display processing unit 105 has a function for OSD displaying the trimming area mode in such a format that it can be intuitively viewed by a graphics display or the like such as an icon or the like in addition to the operation information for the image capture instruction during the reproduction of the proxy moving image.

Figure 18A:
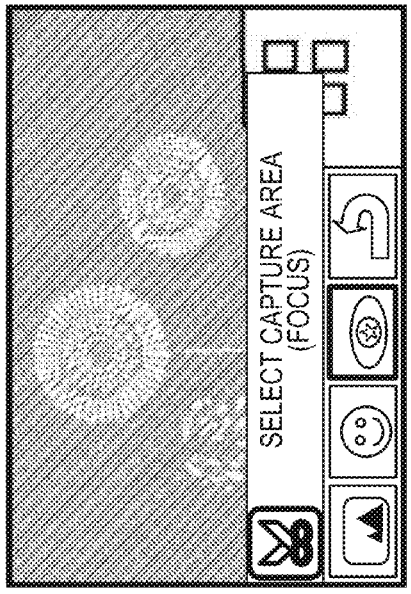
FIGS. 18A, 18B, 18C and 18D are diagrams illustrating examples of a panel output in the image processing method according to the sixth embodiment of the present invention.
Figure 18B:
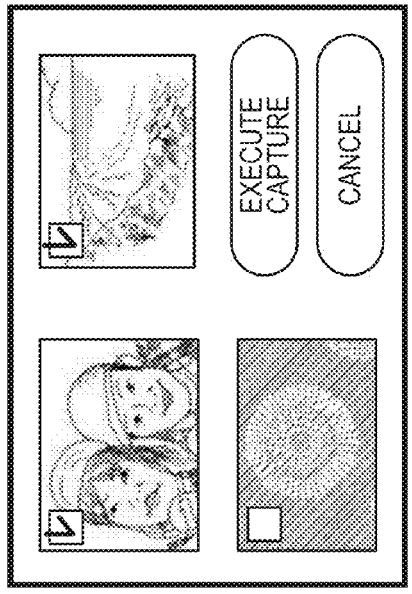
Figure 18C:

FIGS. 18A to 18C illustrate examples of the panel output screen at the time of selecting the capture image. In the examples, a format such as "all", "face area", "focus area", and the like mentioned above in which the user can intuitively presume and discriminate an output result of the developed capture image is used instead of such a user interface that extraction areas by the trimming process are finely set.

Since other functional blocks are similar to those in the second embodiment, their detailed description is omitted here.

<Processing Flow>

The image processing method according to the present embodiment will be described with reference to FIG. 17.

The image processing method according to the present embodiment includes a processing flow illustrated in FIG. 17. The processing flow illustrated in FIG. 17 is substantially the same as that in the image processing method according to the third embodiment illustrated in FIG. 9 except that step S1701 is provided after step S701 and step S1702 is provided between steps S205 and S206.

In step S1701, simultaneously with the capture instruction, the trimming area mode selected by the user is obtained through the interfaces as illustrated in FIGS. 18A to 18C, and screen area information of the development data which is set into the developing unit is generated and registered by the trimming area information storing unit 1601.

In step S1702, in order to set a screen area where the developing process is actually executed to the undeveloped image data which has been expansion processed in step S205, the trimming area information is obtained with reference to the trimming area information storing unit 1601.

In next step S206, the developing process is executed to a part or all of the RAW image data by using the trimming area information obtained in step S1702.

As mentioned above, the processing flow in the image processing method according to the present embodiment is executed.

<Example of Application>

An example of the operation in the case where the foregoing processing flow according to the present embodiment is applied will be described with reference to FIGS. 18A to 18D. It is assumed that operation timing and operating states of respective functional blocks in the image processing method according to the present embodiment are substantially the same as those in the third embodiment illustrated in FIG. 10.

FIGS. 18A to 18C illustrate examples of the panel output image (FIG. 18A) at the selection time $t_A$ of the capture image A, the panel output image (FIG. 18B) at the selection time $t_B$ of the capture image B, and the panel output image (FIG. 18C) at the selection time $t_C$ of the capture image C, respectively.

By displaying the graphical interface as illustrated in the diagram onto the output screen, the user can easily select each trimming mode icon.

In the cases of FIGS. 18A to 18C, the trimming setting of the face area is selected for the capture image A, the setting of all sceneries (no trimming) is selected for the capture image B, and the focus area is selected for the capture image C.

Figure 18D:
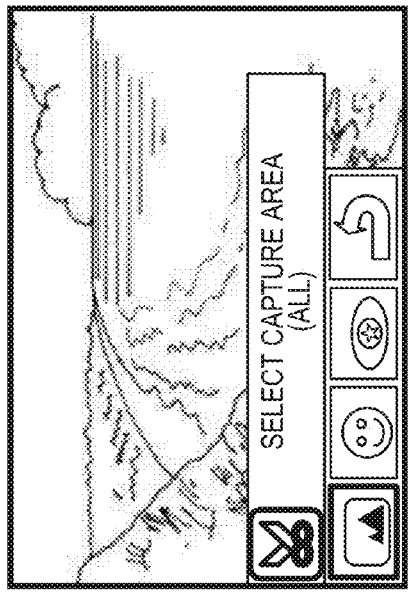

The development screen area is changed in accordance with the trimming mode in which each capture image has been selected on the basis of the foregoing operating flow, a thumbnail image is formed from the developed data at the timing of the reproduction end time $t_{END}$, and the menu screen of FIG. 18D is output.

At this time, since the user can view the thumbnail image in such a form that the trimming setting has been reflected, he can previously confirm the state of the capture image in which only the desired screen area was extracted from the original screen.

As mentioned above, according to the present embodiment, the still image data of a high precision at a desired frame position selected by the user can be developed and generated from the RAW image without temporarily stopping the operation during the reproduction of the moving image. On the other hand, since an editing process for extracting only the favorite area in the screen and still image capturing can be executed by the simple operation in the image recording and reproducing apparatus main body, such a complicated operation that the user edits the still image data later can be made unnecessary.

Seventh Embodiment

An image recording and reproducing apparatus and an image processing method according to a seventh embodiment of the present invention will be described with reference to FIGS. 19 and 20. Component elements similar to those in the image recording and reproducing apparatus and the image processing method according to each of the first to sixth embodiments illustrated in FIGS. 1 to 18D are designated by the same reference numerals and characters and their detailed description is omitted or simplified.

Figure 19:
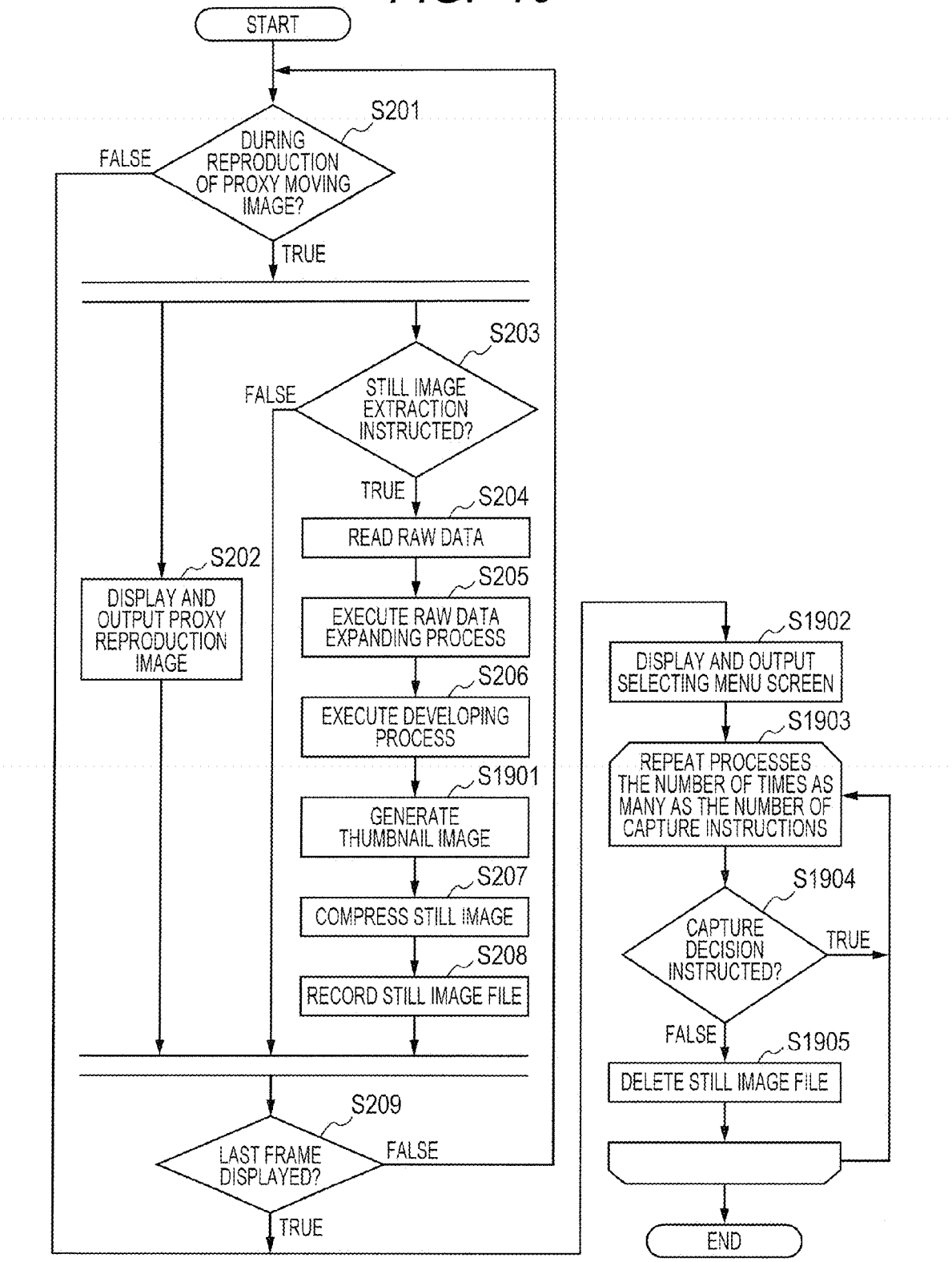
FIG. 19 is a flowchart illustrating an image processing method according to a seventh embodiment of the present invention.

FIG. 19 is a flowchart illustrating the image processing method according to the present embodiment. FIG. 20 is a diagram illustrating operation timing and a transition of an output screen in the image processing method according to the present embodiment.

In the first embodiment, the method whereby the RAW image data at the same time position as that of the frame image which is being displayed and output is developed at the timing when the user has made the capture instruction during the reproduction of the proxy moving image and the still image of the high precision is captured has been described.

In the seventh embodiment, the image recording and reproducing apparatus and the image processing method having such a construction that at the time of the decision of the capture image by the selection of the thumbnail image after completion of the reproduction of the proxy moving image, the image data files which are not decided are deleted from the recording medium will be described. By applying the present embodiment, even in such a system construction that a series of processes from the capture instruction timing to the recording of the still image data into the recording medium are not stopped, the function for storing only the real favorite images can be easily expanded and added.

<System Construction>

A system construction for realizing the present embodiment is similar to that of the image recording and reproducing apparatus according to the first embodiment illustrated in FIG. 1 or the image recording and reproducing apparatus according to the second embodiment illustrated in FIG. 5. Although a description will be made hereinbelow with respect to the system construction of the image recording and reproducing apparatus according to the first embodiment as a prerequisite, the invention may be applied to the system construction of the image recording and reproducing apparatus according to the second embodiment. Also in this case, when describing the present embodiment, a similar effect can be obtained.

It is now assumed that the recording and reproducing unit 111 of the present embodiment has a function for deleting data files of the still image capture recorded in the recording medium 112 by updating file system information in response to an instruction from the system control unit 113.

Since other functional blocks are similar to those in the first or second embodiment, their detailed description is omitted here.

<Operating Flow>

The image processing method according to the present embodiment will be described with reference to FIG. 19.

The image processing method according to the present embodiment includes a processing flow illustrated in FIG. 19. The processing flow illustrated in FIG. 19 is substantially the same as that in the first embodiment illustrated in FIG. 1 except that step S1901 is provided between steps S206 and S207 and steps S1902 to S1905 are provided after step S209. In the case of applying to the second embodiment, steps S1902 to S1905 are executed after the repeating process of step S702 in the processing flow of FIG. 7.

In step S1901, in the display processing unit 105, a reducing process is executed on the basis of the capture image developed in step S206 and a thumbnail image is formed and is temporarily stored into a memory such as a DRAM or the like (not illustrated).

In step S1902, after the reproduction of the proxy moving image, a menu screen for deciding and selecting the capture image is formed by using the thumbnail image formed in step S1901 and is displayed and output.

At timing for executing the decision of the capture instruction, processing steps of steps S1903 to S1905 are repeatedly executed the number of times as many as the number of times of the capture instruction.

In step S1904, whether or not the user has instructed the decision of the capture with respect to the thumbnail image is discriminated. If the capture instruction has been made (TRUE in step S1904), the processing routine advances to the discrimination about the thumbnail image.

If the capture instruction is not made with respect to the thumbnail image (FALSE in step S1904), it is determined that the still image data recorded in the recording medium in steps S207 and S208 is unnecessary.

In step S1905, the still image file in the recording medium 112 which has previously been associated with the thumbnail image which was determined to be unnecessary based on a discrimination result of step S1904 is deleted.

As mentioned above, the processing flow in the image processing method according to the present embodiment is executed.

<Example of Application>

An example of the operation in the case where the foregoing operating flow according to the present embodiment is applied will be described with reference to FIG. 20. FIG. 20 illustrates operating states of the following items to the time direction: that is, an output screen of the reproduction image (panel output); an instruction of the capture of the still image; a reproduction of the proxy moving image; a reading of the compressed RAW data; an expansion of the compressed RAW data; a developing process; a compression encoding of the still image; and a writing of the still image data. An operating state where a deletion of the still image data has been executed is further added to FIG. 20.

In the example of FIG. 20, processes in a range from a development process to the writing of the still image data into the recording medium are executed as a series of sequence at capture instruction timing of the capture images A, B, and C in a manner similar to the first embodiment.

In the present embodiment, thumbnail images are generated from the developed data after the capture instruction and is temporarily stored in accordance with the foregoing operating flow, and at the end of the reproduction of the proxy moving image data (time $t_{END}$), they are arranged and displayed as a capture image deciding menu.

After that, the still image files of the capture images A and C which have already been recorded are deleted at the timing when, for example, the capture image B has been selected (time $t_{CAPTURE}$) by the user operation.

Although the capture images are written into the recording medium on the background at the capture instruction time point as a system operation as mentioned above, a selecting menu by which the present decision can be made is prepared for the user and the non-selected data is deleted later.

Consequently, by applying the present embodiment, in a manner similar to the third embodiment, the number of images in which the capture instruction timing failed is reduced, only the real favorite images can be captured, and usability is improved.

As mentioned above, according to the present embodiment, the still image data of a high precision at a desired frame position selected by the user can be developed and generated from the RAW image without temporarily stopping the operation during the reproduction of the moving image. Only the favorite images of the user can be stored.

Modifications

The present invention is not limited to the foregoing embodiments but various modifications are possible.

For example, although the method of generating the capture images during the reproduction of the proxy moving image is shown in the foregoing first embodiment and the method of generating the capture images after the reproduction of the proxy moving image is shown in the foregoing second embodiment, those processes may be combined. For example, when the number of capture images to which the image processing method according to the first embodiment is applied and the processes are executed exceeds the predetermined number, the image processing method according to the second embodiment is applied to the other subsequent capture images and the capture images can be also generated after the proxy moving image is reproduced.

In the foregoing second embodiment, although the frame position information of the RAW moving image locating at the same time as that of the proxy image which is being displayed has been registered at the time of capture instruction in step S701, the frame position information of the proxy image may be registered. In this case, after the frame position information of the RAW moving image locating at the same time as that of the proxy image which is being displayed is obtained at the time of capture instruction in step S204, it is sufficient to read out only the RAW moving image data to be still image captured.

Although the example in which the unit for selecting the development parameters is added to the image recording and reproducing apparatus and the image processing method according to the second embodiment has been shown in the foregoing fifth embodiment, the unit for selecting the development parameters may be added to the image recording and reproducing apparatus and the image processing method according to the first embodiment.

Although the example in which the unit for selecting the trimming area is added to the image recording and reproducing apparatus and the image processing method according to the second embodiment has been shown in the foregoing sixth embodiment, the unit for selecting the trimming area may be added to the image recording and reproducing apparatus and the image processing method according to the first embodiment.

Both of the unit for selecting the development parameters and the unit for selecting the trimming area may be added to the image recording and reproducing apparatus and the image processing method according to the first or second embodiment.

Although the example in which the image processes are executed in the system in the image recording and reproducing apparatus has been shown in the foregoing embodiment, the image processing method shown in the foregoing embodiment may be executed in another apparatus different from the image recording and reproducing apparatus, for example, in a personal computer or the like. For example, after the user stored the moving image data recorded by the imaging device into a storage area of the personal computer, the foregoing image processes may be executed to the stored moving image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-215521, filed Oct. 22, 2014, which is hereby incorporated by reference herein in its entirety.

What is claimed is:

1. An image processing apparatus comprising:
a processor; and
a memory storing a program which, when executed by the processor, causes the image processing apparatus to:
(1) read out a first moving image data from a recording medium which stores (a) a second moving image data which is undeveloped and (b) the first moving image data, which is generated by developing the second moving image data;
(2) reproduce the first moving image data by displaying on a display means a display image obtained by performing a display processing on the first moving image data read out from the recording medium;
(3) specify a plurality of frame positions in the first moving image data by receiving a plurality of instructions of a user while the first moving image data is being reproduced;
(4) after the reproducing of the first moving image data, (a) read out a plurality of frames of the second moving image data which corresponds to a plurality of frames of the first moving image data based on the specified plurality of frame positions in the first moving image data, (b) generate a plurality of developed images by performing developing process on the read out plurality of frames of the second moving image data, and (c) display on the display means a plurality of display-developed images which corresponds to the plurality of developed images;
(5) generate a still image data by encoding a developed image which corresponds to a display-developed image selected by the user out of the plurality of display-developed images displayed on the display means; and
(6) record the generated still image data on the recording medium.

2. The image processing apparatus according to claim 1, wherein the program, when executed by the processor, further causes the image processing apparatus to specify frame positions before and after a frame position designated by the user.

3. The image processing apparatus according to claim 1, wherein the program, when executed by the processor, further causes the image processing apparatus to select a development parameter from a plurality of development parameters which have preliminarily been prepared in response to an instruction of the user, and
wherein the developing process of the frame is executed on the basis of the selected development parameter.

4. The image processing apparatus according to claim 1, wherein the program, when executed by the processor, further causes the image processing apparatus to select a trimming area from a plurality of trimming areas which have preliminarily been prepared in response to an instruction of the user, and
wherein the developing process on the read out plurality of frames of the second moving image data is executed on the basis of the selected trimming area.

5. The imaging processing apparatus according to claim 1, wherein the developing process of the read out frames is executed to:
generate thumbnail images from the still image data;
output the thumbnail images to a screen;
select an image in response to an instruction of the user; and
delete the still image data corresponding to the selected thumbnail image from the recording medium.

6. The imaging processing apparatus according to claim 1, wherein the first moving image data and the second moving image data are recorded on the recording medium simultaneously.

7. The image processing apparatus according to claim 1, wherein the program, when executed by the processor, further causes the image processing apparatus to start the reading out and the developing process of the plurality of frames of the second moving image data in accordance with a completion of the reproducing of the first moving image data.

8. An image processing method comprising:
reading out a first moving image data from a recording medium which stores (a) a second moving image data which is undeveloped and (b) the first moving image data, which is generated by developing the second moving image data;
reproducing the first moving image data by displaying on a display means a display image obtained by performing a display processing on the first moving image data read out from the recording medium;
specifying a plurality of frame positions in the first moving image data by receiving a plurality of instructions of a user while the first moving image data is being reproduced;
after the reproducing of the first moving image data, (a) reading out a plurality of frames of the second moving image data which corresponds to a plurality of frames of the first moving image data based on the specified plurality of frame positions in the first moving image data, (b) generating a plurality of developed images by performing a developing process on the read out plurality of frames of the second moving image data, and (c) displaying on the display means a plurality of display-developed images which corresponds to the plurality of developed images;

generating a still image data by encoding a developed image which corresponds to a display-developed image selected by the user out of the plurality of display-developed images displayed on the display means; and
recording the generated still image data on the recording medium.

* * * * *